United States Patent
Yamamoto et al.

(10) Patent No.: US 10,343,319 B2
(45) Date of Patent: Jul. 9, 2019

(54) INJECTION MOLDING MACHINE AND METHOD FOR ASSISTING IN MANIPULATION OF INJECTION MOLDING MACHINE

(71) Applicant: Sodick Co., Ltd., Kanagawa (JP)

(72) Inventors: Shinya Yamamoto, Kanagawa (JP); Hideo Shimamoto, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 126 days.

(21) Appl. No.: 15/236,490

(22) Filed: Aug. 15, 2016

(65) Prior Publication Data

US 2017/0050362 A1 Feb. 23, 2017

(30) Foreign Application Priority Data

Aug. 17, 2015 (JP) ................. 2015-160426

(51) Int. Cl.
| | | |
|---|---|---|
| *B29C 45/77* | (2006.01) | |
| *B29C 45/64* | (2006.01) | |
| *B29C 45/76* | (2006.01) | |
| *B29C 45/78* | (2006.01) | |
| *B29K 105/00* | (2006.01) | |

(52) U.S. Cl.
CPC ............. *B29C 45/77* (2013.01); *B29C 45/64* (2013.01); *B29C 45/7653* (2013.01); *B29C 45/78* (2013.01); *B29C 2045/7606* (2013.01); *B29C 2945/76006* (2013.01); *B29C 2945/76498* (2013.01); *B29C 2945/76531* (2013.01); *B29C 2945/76568* (2013.01); *B29K 2105/0067* (2013.01)

(58) Field of Classification Search
CPC ..... B29C 45/77; B29C 45/64; B29C 45/7653; B29C 45/78
See application file for complete search history.

(56) References Cited

U.S. PATENT DOCUMENTS 4,734,025 A * 3/1988 Kawamura ............ B29C 45/76
264/328.8
5,995,009 A 11/1999 Yonezawa et al.
(Continued)

FOREIGN PATENT DOCUMENTS

| CN | 1853908 | 11/2006 |
|---|---|---|
| JP | H04316821 | 11/1992 |

(Continued)

OTHER PUBLICATIONS

"The English translation of Notification of Reasons for Refusal of Japanese Counterpart Application," dated Jul. 18, 2017, pp. 1-4.
(Continued)

*Primary Examiner* — Jacob T Minskey
*Assistant Examiner* — Melody Tsui
(74) *Attorney, Agent, or Firm* — JCIPRNET

(57) ABSTRACT

An injection molding machine is provided, wherein a display device displays screens requesting an operator to manipulate the injection molding machine in order in accordance with a manipulation procedure for the injection molding machine from automatic setting of initial molding conditions until actual molding of a molded article, and a guidance showing the manipulation procedure.

7 Claims, 19 Drawing Sheets

(56) References Cited

U.S. PATENT DOCUMENTS

2006/0247821 A1* 11/2006 Nishizawa .............. B29C 45/76
                                                    700/200
2013/0103184 A1   4/2013 Morikawa et al.
2015/0328812 A1* 11/2015 Kozuka .............. B29C 45/1753
                                                    264/39

FOREIGN PATENT DOCUMENTS

| JP | 2004160958 | 6/2004 |
| JP | 2007210347 | 8/2007 |
| JP | 2012011660 | 1/2012 |

OTHER PUBLICATIONS

"Office Action of China Counterpart Application," dated Sep. 30, 2018, with English translation thereof, p. 1-p. 13.

* cited by examiner

FIG. 11A

Conditions Navigation: Molding Conditions

Select a resin

| Resin Used | Temperature Range |
|---|---|
| PP 200°C | 190 - 280°C |
| PP 200°C | |
| LDPE 190°C | |
| HDPE 200°C | |
| PS 190°C | |
| PMMA 200°C | |
| ABS 230°C | |
| PPE 270°C | |

Resin Set Temperature  0  °C
※If you want to adjust the resin temperature, please input a numerical value manually.

< >  Return to NORMAL SCREEN

STEP1 > STEP2 > STEP3 > STEP4

FIG. 11B

Conditions Navigation: Setting Basic Machining Conditions

Molded Item Information

Volume Input

Weight Input  Product Weight 0.00 g  Specific Gravity 1.00
Minimum Wall Thickness 0.00 mm  Maximum Wall Thickness 0.00 mm Injection Stroke        ****mm
Standard Filling Time   **** sec
V-P Change Position     ****mm
Metering Value          ****mm
Maximum Filling Time    **** sec
Standard Dwelling Time  **** sec
Standard Cooling Time   **** sec < >  Return to NORMAL SCREEN

STEP1 > STEP2 > STEP3 > STEP4

FIG. 18

INJECTION MOLDING MACHINE AND METHOD FOR ASSISTING IN MANIPULATION OF INJECTION MOLDING MACHINE

CROSS-REFERENCE TO RELATED APPLICATION

This application claims the priority benefit of Japanese patent application no. 2015-160426, filed on Aug. 17, 2015. The entirety of the above-mentioned patent application is hereby incorporated by reference herein and made a part of this specification.

BACKGROUND OF THE DISCLOSURE

Technical Field

The disclosure relates to an injection molding machine filling a molten molding material into a mold to thereby mold a molded article. The disclosure also relates to a method for assisting in manipulation of an injection molding machine.

Description of the Background Art

An injection molding machine generally includes a mold clamping device, an injection device, and a control device controlling the above devices. The mold clamping device opens, closes and tightens a mold. The injection device melts a molding material and fills the measured molten molding material into the mold. The control device controls the injection molding machine. The molding material includes resin, metal, or a composite material thereof. The injection molding machine repeats a molding cycle in which, e.g., a mold closing step, a mold clamping step, a filling step, a dwelling step, a cooling step, a measurement step, a mold opening step and a take-out step, are performed sequentially, so as to continuously mold a molded article.

The optimum molding conditions are set for each step. The optimum molding conditions are determined by performing a test molding. The test molding requires a skilled operator's experience or intuition. In Patent Document 1, initial molding conditions for performing an initial molding by a mold with unknown molding conditions are automatically set based on information pre-stored in the injection molding machine and information inputted in a dialog form by the operator.

PRIOR-ART LITERATURE

Patent Literature

Patent Literature 1: Japanese Patent Publication No. H04-316821

SUMMARY

Problems to be Solved

In Patent Document 1, it does not mean that it is possible to perform the initial molding immediately only by setting the initial molding conditions in the injection molding machine. The injection molding machine has to perform several operations prior to the initial molding.

The disclosure shortens a time required from automatic setting of the initial molding conditions in the injection molding machine until an actual molding of a molded article by the injection molding machine, even for an operator unfamiliar with manipulation of the injection molding machine. Additional objects and advantages of the disclosure will be set forth in the description that follows.

Means for Solving the Problems

An injection molding machine (1) of the disclosure is an injection molding machine including: a mold clamping device (2), opening and closing a mold (20); an injection device (3), including a cylinder (50, 60, 62), a nozzle (63), and a heater (69) that heats a molding material inside the cylinder and the nozzle, and filling the melted molding material into the mold; a display device (47), displaying an operator's procedure for manipulating the mold clamping device and the injection device; a manipulation panel (48), for the operator to manipulate the mold clamping device and the injection device; and a control device (4), including a signal receiving section (49) that receives an input signal inputted by the operator's manipulation of the manipulation panel, and controlling the mold clamping device and the injection device in accordance with the input signal, wherein the injection molding machine molds a molded article in the mold, wherein the control device includes: a molding condition setting section (84), displaying in the display device a screen that requests the operator to input information about the molding material, information about the molded article and information about the mold and a guidance that shows a procedure for the manipulation, so as to generate and set a molding condition based on the information about the molding material, the information about the molded article and the information about the mold; a heater control section (81), assisting in a manipulation of, after the molding condition is set, displaying in the display device a screen that requests the operator to manipulate the manipulation panel to activate the heater and a guidance that shows a procedure for the manipulation, so as to activate the heater; and a molding material change control section (82), assisting in a manipulation of, after the cylinder and the nozzle are heated to a predetermined temperature by the heater, displaying in the display device a screen that requests the operator to manipulate the manipulation panel to make the injection molding machine start a purge and a guidance that shows a procedure for the manipulation, so as to carry out a molding material change.

The molding condition may at least include a temperature condition during heating of the molding material by the heater, a filling condition including an injection speed during filling of the molding material into the mold, a measurement condition including a metering value for measuring the molding material for filling, and a mold opening/closing condition including a position and a speed at which the mold is opened and closed.

In addition, the control device may include a protecting condition setting section (85) that, after the molding condition is set, displays in the display device a screen that requests the operator to input information about a function of protecting the mold and a guidance that shows a procedure for the manipulation, so as to generate and set a condition for protecting the mold based on the information for protecting the mold.

The purge may include at least one of a screw purge, a plunger cleaning, a short stroke purge, and a full stroke purge.

The molding material change control section assisting in the manipulation of carrying out the molding material change may display in the display device a screen that requests the operator to manipulate the manipulation panel to start each of the screw purge, the plunger cleaning, the short stroke purge and the full stroke purge in the above order and a guidance that shows a procedure for the manipulation.

The control device may include: a molding defect input control section (86), assisting in displaying in the display device a screen that requests the operator to input information about a state of a molding defect formed in the molded article and a guidance that shows a procedure for the manipulation, so as to input the information about the state of the molding defect; and a molding defect improving control section (87), assisting in a manipulation of displaying in the display device a method for improving the molding defect according to the information about the state of the molding defect, and displaying in the display device a screen that requests the operator to improve the molding defect and a guidance that shows a procedure for the manipulation, so as to improve the molding defect.

A method for assisting in manipulation of the injection molding machine (1) of the disclosure is a method for assisting in manipulation of an injection molding machine, wherein the injection molding machine includes: a mold clamping device (2), opening and closing a mold (20); an injection device (3), including a cylinder (50, 60, 62), a nozzle (63), and a heater (69) that heats a molding material inside the cylinder and the nozzle, and filling the melted molding material into the mold; a display device (47), displaying an operator's procedure for manipulating the mold clamping device and the injection device; a manipulation panel (48), for the operator to manipulate the mold clamping device and the injection device; and a control device (4), including a signal receiving section (49) that receives an input signal inputted by the operator's manipulation of the manipulation panel, and controlling the mold clamping device and the injection device in accordance with the input signal, and wherein the injection molding machine molds a molded article in the mold, the method for assisting in manipulation of the injection molding machine including, by the control device, displaying in the display device a screen that requests the operator to input information about the molding material, information about the molded article and information about the mold and a guidance that shows a procedure for the manipulation, so as to generate and set a molding condition based on the information about the molding material, the information about the molded article and the information about the mold (S2 to S7); assisting in a manipulation of, after setting the molding condition, displaying in the display device a screen that requests the operator to manipulate the manipulation panel to activate the heater and a guidance that shows a procedure for the manipulation, so as to activate the heater (S10 to S11), and assisting in a manipulation of, after heating the cylinder and the nozzle to a predetermined temperature by the heater, displaying in the display device a screen that requests the operator to manipulate the manipulation panel to make the injection molding machine start a purge and a guidance that shows a procedure for the manipulation, so as to carry out a molding material change (S12 to S15).

Effects of the Disclosure

The disclosure is capable of shortening a time required from making the injection molding machine automatically set initial molding conditions until actually molding the molded article by the injection molding machine, even for the operator unfamiliar with manipulation of the injection molding machine. The disclosure enables even the operator unfamiliar with manipulation of the injection molding machine to make the injection molding machine perform a purge. The disclosure enables even an operator having little knowledge about injection molding to mold a molded article of good quality by the injection molding machine.

BRIEF DESCRIPTION OF THE DRAWINGS

FIG. 11A and FIG. 11B are examples of screens requesting input of information about a molding material and information about a molded article.

Figure 18:
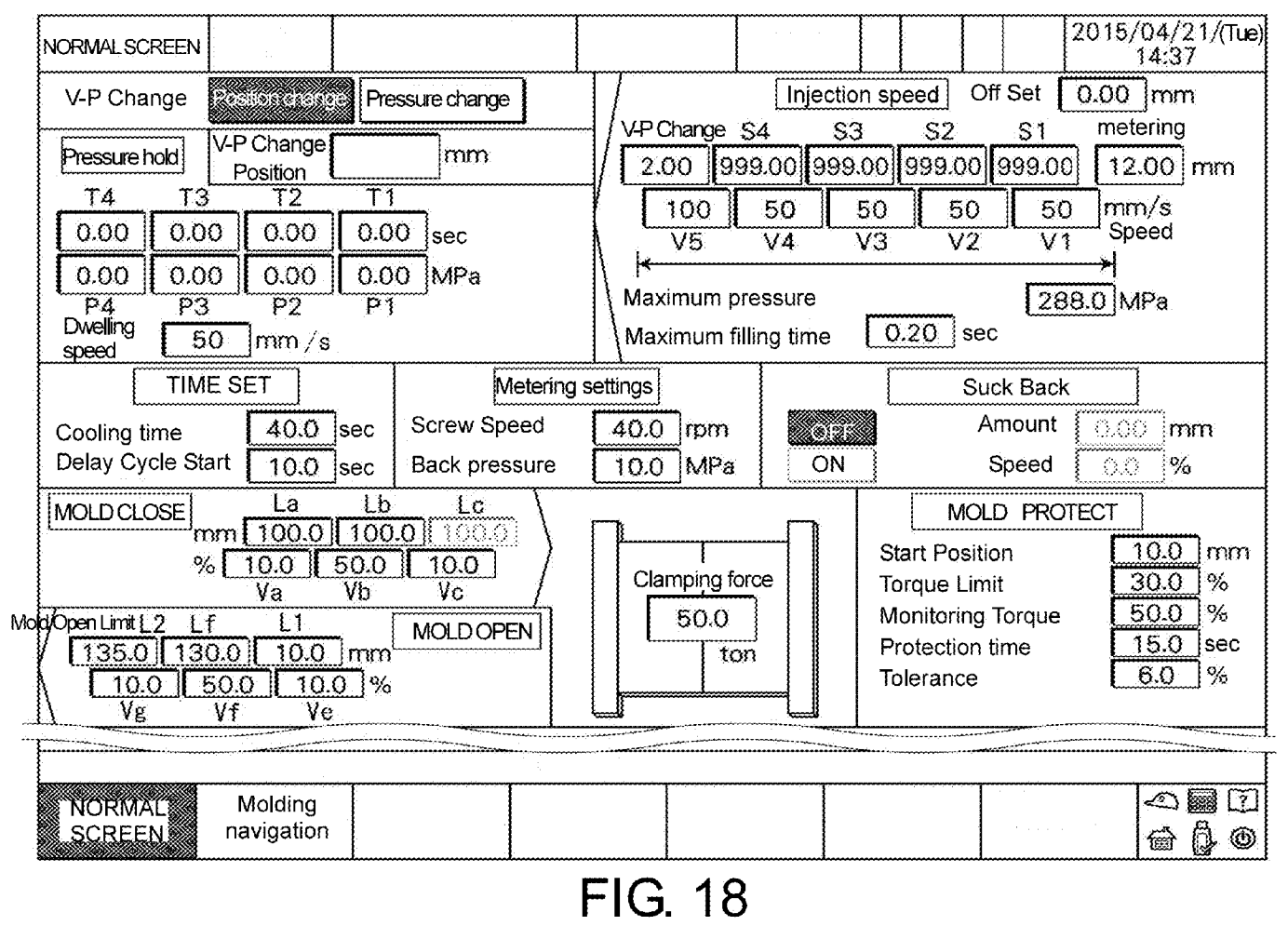

FIG. 18 is an example of a normal screen.

DESCRIPTION OF THE EMBODIMENTS

Figure 1:
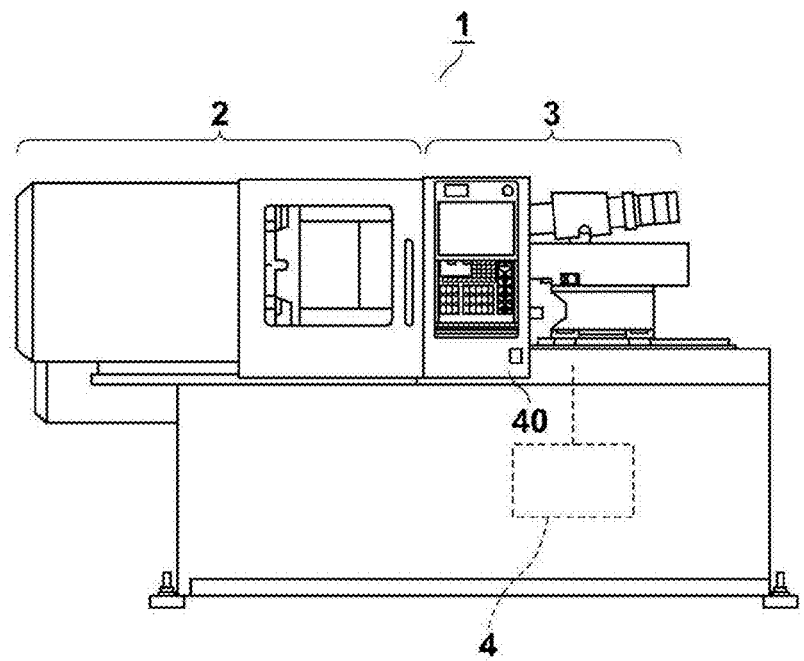
FIG. 1 is a schematic configuration diagram of an injection molding machine according to an embodiment of the disclosure.

The embodiments of the disclosure are hereinafter explained by way of drawings. An injection molding machine 1 shown in FIG. 1 includes a mold clamping device 2, an injection device 3, a control device 4 controlling the mold clamping device 2 and the injection device 3, and a manipulation panel unit 40 of the control device 4.

Figure 2:
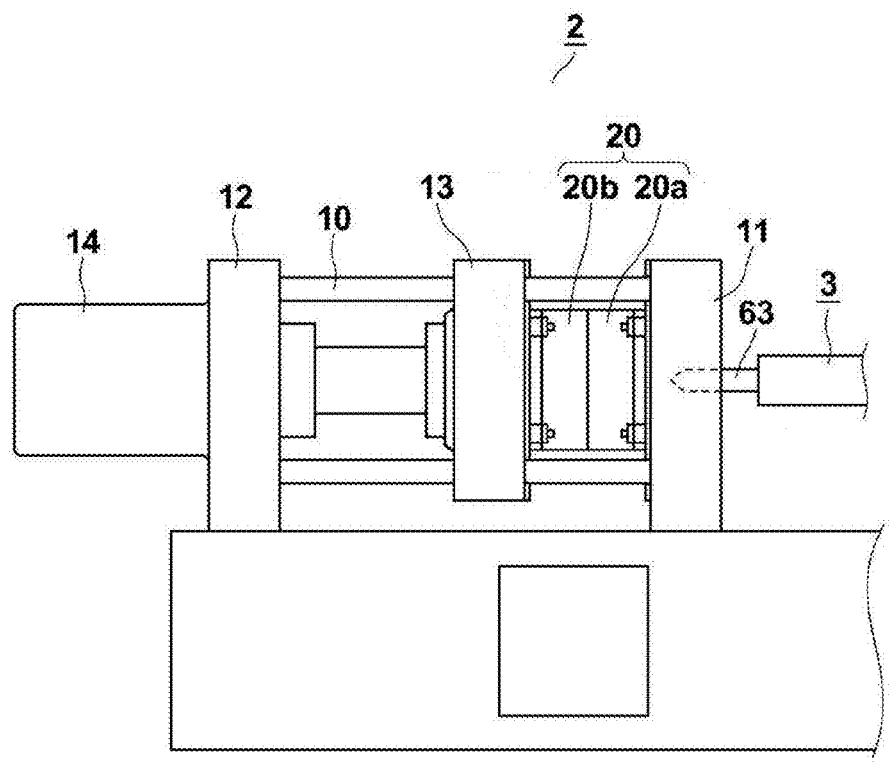
FIG. 2 is a schematic diagram of a mold clamping device of the injection molding machine according to an embodiment of the disclosure.

The mold clamping device 2 shown in FIG. 2 includes a stationary platen 11, a support platen 12, and a movable platen 13. A plurality of tie-bars 10 extend parallel between the stationary platen 11 and the support platen 12. The movable platen 13 moves while guided by the tie-bars 10. An appropriate driving device 14 is provided that moves the movable platen 13 and that generates a clamping force. An ejector pin is provided in a mold 20, and the movable platen 13 includes an ejector rod. The ejector rod is advanced and retreated by an appropriate driving device.

The mold 20 includes a mold 20a on the side of the stationary platen 11 and a mold 20b on the side of the movable platen 13. The mold 20a on the side of the stationary platen 11 is fixed to the stationary platen 11. The mold 20b on the side of the movable platen 13 is fixed to the movable platen 13.

In the mold 20, by advancing the movable platen 13 toward the stationary platen 11, the mold 20a on the side of the stationary platen 11 and the mold 20b on the side of the movable platen 13 therebetween are closed. The closed mold 20 is tightened up by advancing the movable platen 13 toward the stationary platen 11. The mold 20 is tightened up before being filled with molten resin.

In the mold 20, the mold 20a on the side of the stationary platen 11 and the mold 20b on the side of the movable platen 13 therebetween are opened by retreating the movable platen 13 from the stationary platen 11. The mold 20 is opened when the filled molten resin is cooled and solidified to become a molded article. The molded article is taken out of the mold 20 by being pushed out from the opened mold 20 by the ejector pin.

Figure 3:
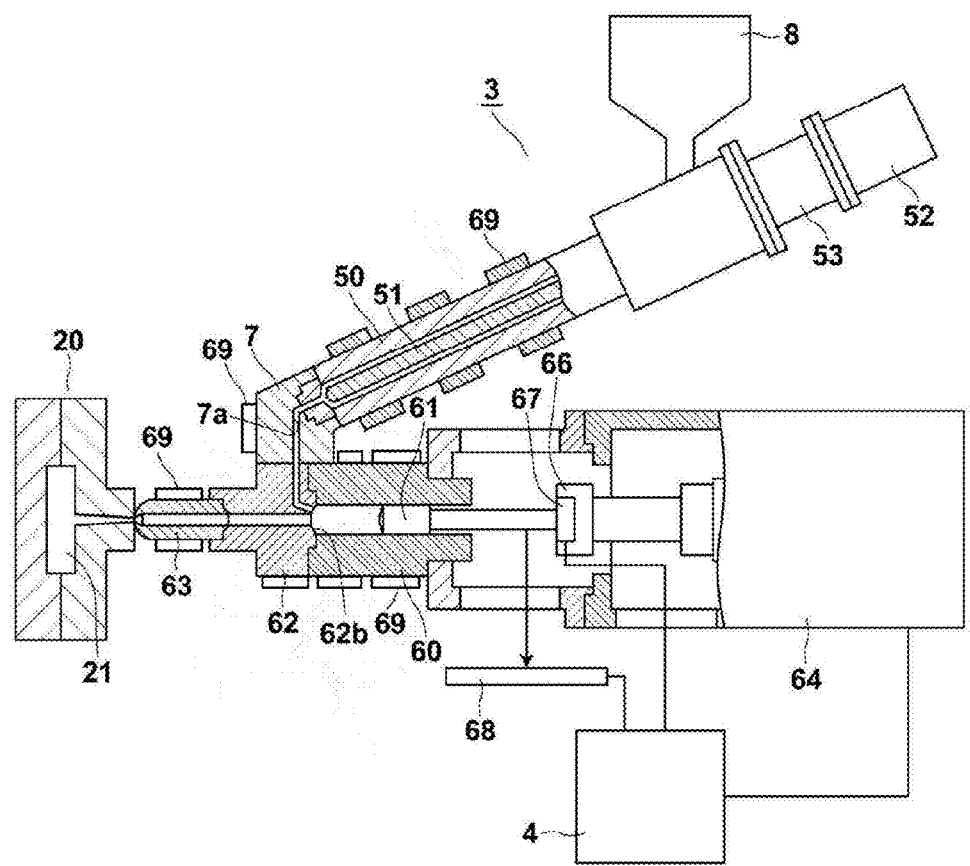
FIG. 3 is a schematic diagram of an injection device of the injection molding machine according to an embodiment of the disclosure.

The injection device 3 shown in FIG. 3 includes a plasticization cylinder 50, an injection cylinder 60, and a junction 7 connecting both cylinders. The injection cylinder 60 includes a nozzle cylinder 62. A communicating path 7a is formed in the junction 7.

As shown in FIG. 3, a molding material such as a resin material is supplied from a hopper 8 into the plasticization cylinder 50. A screw 51 is accommodated in the plasticization cylinder 50, and a heater 69 is wound around an outer surface of the plasticization cylinder 50. Due to heating by heat from the heater 69 and shear heating by rotation of the screw 51, the molding material is melted.

Figure 4:
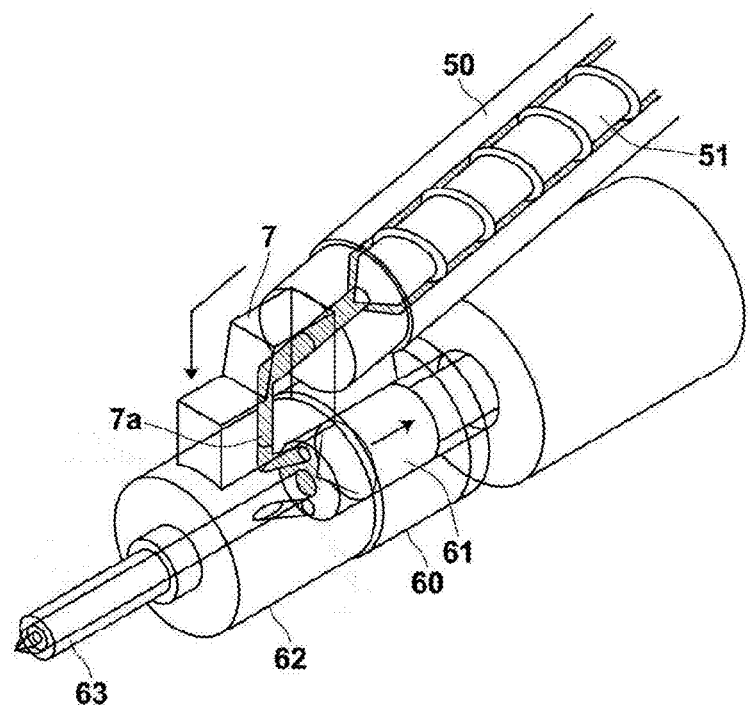
FIG. 4 a diagram for explaining an operation (part 1) of the injection device.

As shown in FIG. 4, by rotation of the screw 51, the melted molding material such as molten resin is supplied to the injection cylinder 60 through the communicating path 7a. The screw 51 is rotated by an appropriate driving device 52.

Figure 5:
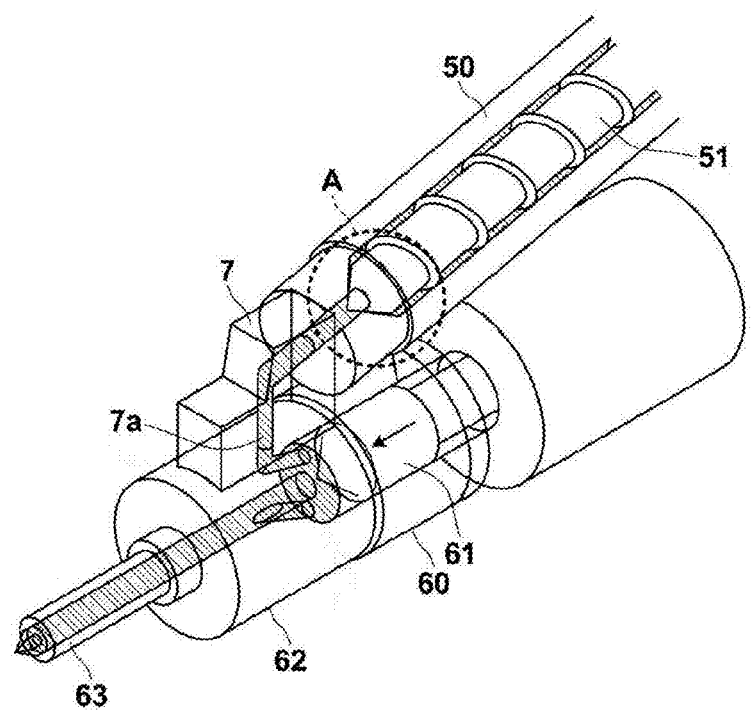
FIG. 5 a diagram for explaining the operation (part 2) of the injection device.

As shown in FIG. 5, a plunger 61 is accommodated in the injection cylinder 60 in a manner capable of advancing and retreating. The molten resin supplied from the plasticization cylinder 50 causes the plunger 61 to retreat. The molten resin is measured by a distance that the plunger 61 has retreated. A position of the plunger 61 is detected by an appropriate position detector 68.

When the plunger 61 advances, the molten resin in the injection cylinder 60 is filled through a nozzle 63 into a mold cavity space 21 formed in the mold 20. The molten resin in the mold 20 is held in a state of being pressed by the plunger 61 at a predetermined pressure so as not to flow backward until the molten resin at a gate portion is cooled and solidified. The plunger 61 is advanced and retreated by an appropriate driving device 64. The pressure of the molten resin in the mold 20 is detected by an appropriate pressure detector 67.

Before the plunger 61 advances, the communicating path 7a is closed so that the molten resin in the injection cylinder 60 does not flow backward to the plasticization cylinder 50. For example, as shown by the portion A in FIG. 5, the communicating path 7a is blocked by a tip of the screw 51 that has slightly advanced. The screw 51 is slightly advanced and retreated by an appropriate driving device 53.

The heater 69 is wound around the outer surfaces of the plasticization cylinder 50, the injection cylinder 60, the junction 7 and the nozzle 63. The plasticization cylinder 50 and the injection cylinder 60 are axially divided into a plurality of zones such as a tip portion, a middle portion and a rear end portion, around which a plurality of heaters 69 are wound.

Figure 6:
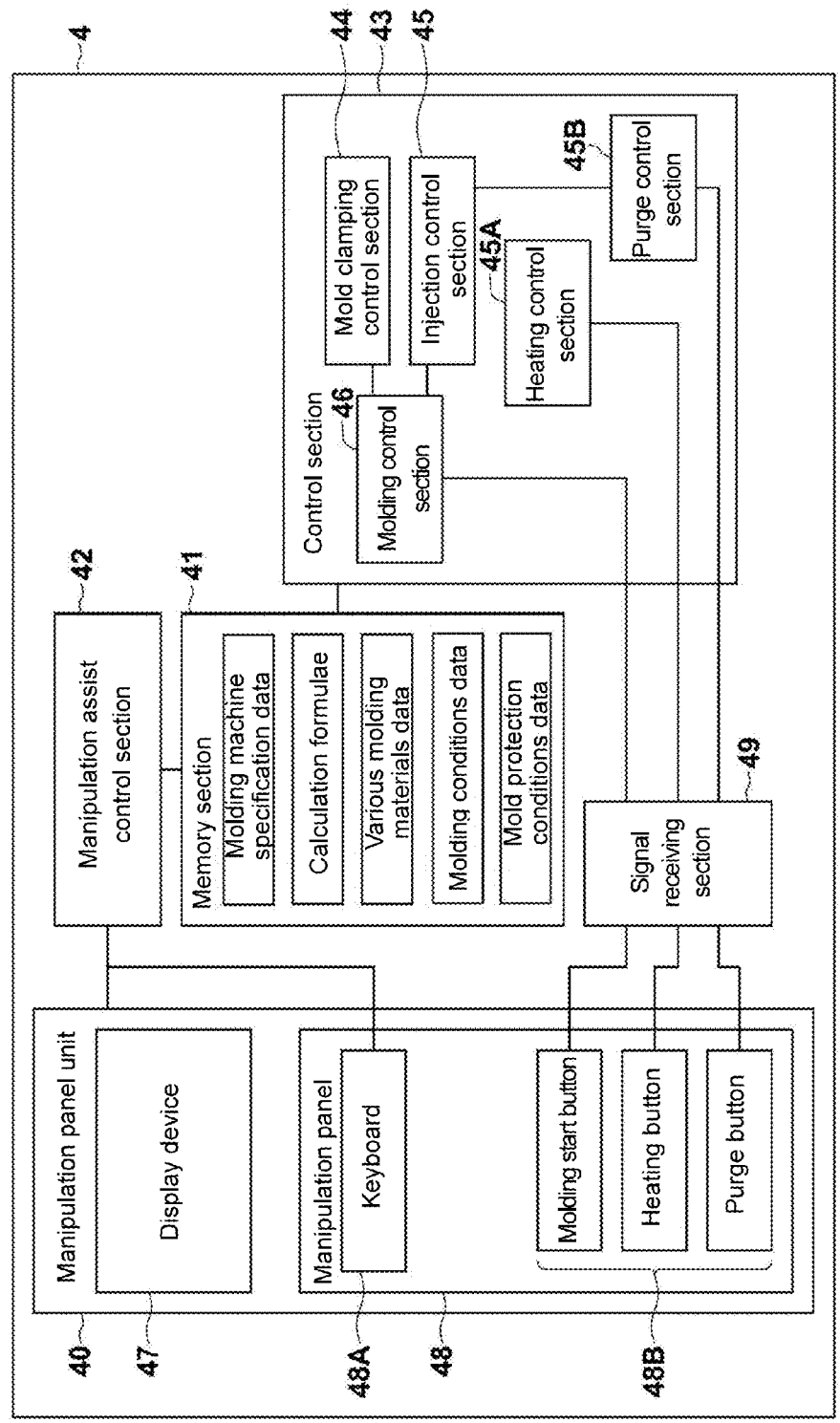
FIG. 6 is a block diagram showing a configuration of a control device according to an embodiment of the disclosure.

The control device 4 shown in FIG. 6 includes the manipulation panel unit 40, a memory section 41, an arithmetic device including a central processing unit (CPU), a control section 42 assisting in various manipulations of the injection molding machine 1, and a control section 43 controlling operations of the injection molding machine 1.

The control section 43 controlling operations of the injection molding machine 1 includes a control section 44 controlling the various driving devices of the mold clamping device 2, such as the driving device 14, a control section 45 controlling the various driving devices of the injection device 3, such as the driving devices 52, 53 and 64, and a control section 46 controlling both control sections 44 and 45 so as to control an operation of molding a molded article in an order such as mold closing, mold clamping, filling, dwelling, cooling, measurement, mold opening, and take-out of the molded article. The control section 43 controlling operations of the injection molding machine 1 includes a control section 45A controlling heating of the heater 69, and a control section 45B controlling purge operations of the injection device 3.

Figure 7:
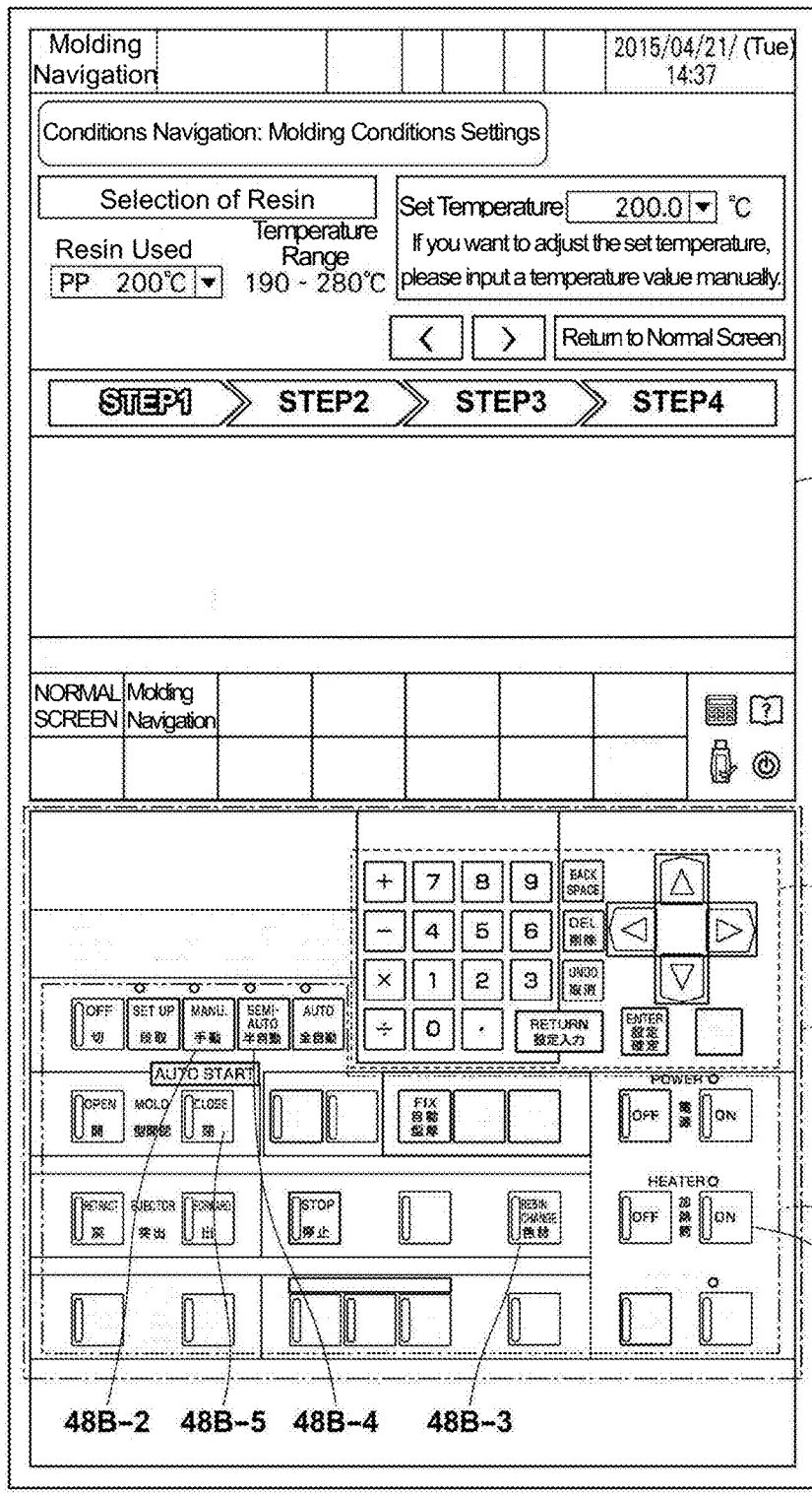
FIG. 7 is an example of a configuration diagram of a front surface of a manipulation panel unit.

The manipulation panel unit 40 shown in FIG. 6 and FIG. 7 includes a display device 47 and a manipulation panel 48. The display device 47 includes a touch panel 47A provided so as to cover a screen. The manipulation panel 48 includes a keyboard 48A and various manipulation buttons 48B. The touch panel 47A and the keyboard 48A are input sections for inputting various information. The various manipulation buttons 48B of the manipulation panel 48 include a heating button 48B-1, purge buttons 48B-2 and 48B-3, and molding start buttons 48B-4 and 48B-5.

The control device 4 includes a signal receiving section 49 receiving an input signal generated upon pressing of the various manipulation buttons 48B including the heating button 48B-1, the purge buttons 48B-2 and 48B-3, and the molding start buttons 48B-4 and 48B-5. When the signal receiving section 49 receives the input signal generated upon pressing of the heating button 48B-1, the control section 45A controlling heating of the heater 69 is activated to start the heating by the heater 69. When the signal receiving section 49 receives the input signal generated upon pressing of the purge buttons 48B-2 and 48B-3, the control section 45B controlling purge operations is activated to start a purge. When the signal receiving section 49 receives the input signal generated upon pressing of the molding start buttons 48B-4 and 48B-5, the control section 46 controlling the operation of molding a molded article is activated to start molding.

The heating button 48B-1 refers to, e.g., the button 48B-1 labeled "HEATER ON" on the manipulation panel 48 shown in FIG. 7. The purge buttons 48B-2 and 48B-3 refer to, e.g., the button 48B-2 labeled "MANU." and the button 48B-3 labeled "RESIN CHANGE" on the manipulation panel 48 shown in FIG. 7. The button 48B-3 labeled "RESIN CHANGE" functions by pressing of the button 48B-2 labeled "MANU." to set the injection molding machine 1 to a manual mode in advance. The molding start buttons 48B-4 and 48B-5 refer to, e.g., the button 48B-4 labeled "SEMI-AUTO" and the button 48B-5 labeled "MOLD CLOSE (AUTO START)", respectively, on the manipulation panel 48 shown in FIG. 7. The button 48B-5 labeled "MOLD CLOSE (AUTO START)" functions by pressing of the button 48B-4 labeled "SEMI-AUTO" to set the injection molding machine 1 to a semi-automatic mode in advance. The various manipulation buttons and the input section are not limited to these embodiments.

Figure 8:
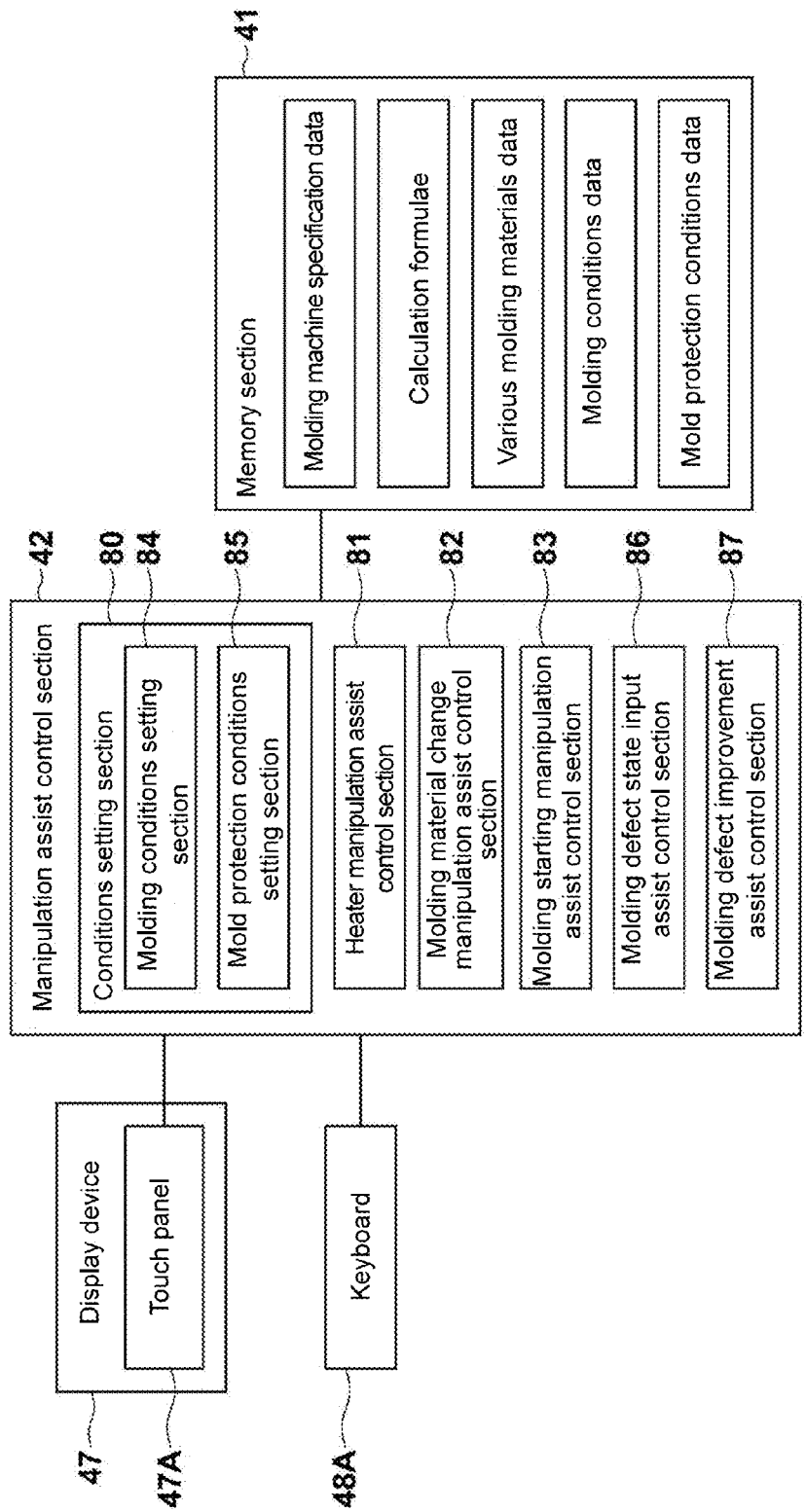
FIG. 8 is a block diagram showing a configuration of a control section contained in the control device, the control section assisting in manipulation of the injection molding machine.

The control section 42 shown in FIG. 8 that assists in various manipulations of the injection molding machine 1 includes a setting section 80 setting various conditions of the injection molding machine 1, a control section 81 assisting in a manipulation of activating the heater, a control section 82 assisting in a manipulation of carrying out a molding material change, a control section 83 assisting in a manipulation of starting molding, a control section 86 assisting in inputting information about a state of a molding defect of the molded article, and a control section 87 assisting in a manipulation to improve the molding defect of the molded article.

The setting section 80 setting various conditions of the injection molding machine 1 includes a setting section 84 generating data of molding conditions to set the memory section 41, and a setting section 85 generating data of conditions for protecting the mold 20.

The setting section 84 generating data of molding conditions to set the memory section 41 causes the display device 47 to display a screen that requests an operator to input information about the molding material to be used, information about the molded article to be molded, and information about the mold 20 to be used, and causes the display device 47 to display a guidance that shows a procedure for manipulating the injection molding machine 1. The data of molding conditions is generated using the various information inputted from the input sections 47A and 48A by the operator, as well as specification data of the injection molding machine 1, data tables of various molding materials and calculation formulae pre-stored in the memory section 41.

The setting section 85 generating data of conditions for protecting the mold 20 to set the memory section 41 causes the display device 47 to display a screen that requests the operator to input whether or not to use a function of protecting the mold 20, and information about sensitivity of the function of protecting the mold 20, and causes the display device 47 to display a guidance that shows a procedure for manipulating the injection molding machine 1. The conditions for protecting the mold 20 are generated using information about the mold protection function inputted from the input sections 47A and 48A by the operator, as well as the specification data of the injection molding machine 1 and the calculation formulae pre-stored in the memory section 41.

The control section 81 assisting in the manipulation of activating the heater 69 causes the display device 47 to display a screen that requests the operator to manipulate the heating button 48B-1 to activate the heater 69, and causes the display device 47 to display a guidance that shows a procedure for manipulating the injection molding machine 1.

The control section 82 assisting in the manipulation of carrying out the molding material change causes the display device 47 to display a screen that requests the operator to manipulate the purge buttons 48B-2 and 48B-3 to make the injection molding machine 1 perform a purge operation, and causes the display device 47 to display a guidance that shows a procedure for manipulating the injection molding machine 1. The control section 82 assisting in the manipulation of carrying out the molding material change causes the display device 47 to display a screen that requests the operator to change a preset purge condition. The control section 82 assisting in the manipulation of carrying out the molding material change causes the display device 47 to display a screen that requests the operator to, if viscosity of the molten resin is higher than expected, change a temperature condition of the heater 69 in order to raise the temperature of the heater 69.

The molding material change includes a color change. The color change is performed in order to discharge the resin material inside the cylinders such as the plasticization cylinder 50, the injection cylinder 60 and the nozzle cylinder 62, etc. The color change is preferably performed through a plurality of kinds of purges in a predetermined order. The purges are performed in an order such as a screw purge, plunger cleaning, a short stroke purge, and a full stroke purge.

The control section 83 assisting in the manipulation of starting molding causes the display device 47 to display a screen that requests the operator to, after completing the color change, manipulate the molding start buttons 48B-4 and 48B-5 to make the injection molding machine 1 start molding, and causes the display device 47 to display a guidance that shows a procedure for manipulating the injection molding machine 1.

The control section 86 assisting in inputting information about a state of a molding defect of the molded article causes the display device 47 to display a screen that requests the operator to input information about a state of a molding defect formed in the molded article, and causes the display device 47 to display a guidance that shows a procedure for manipulating the injection molding machine 1.

According to the information about the state of the molding defect of the molded article inputted by the operator, the control section 87 assisting in the manipulation to improve the molding defect of the molded article displays in the display device 47 a method for improving the molding defect, and causes the display device 47 to display a screen that requests the operator to improve the molding defect of the molded article and a guidance that shows a procedure for manipulating the injection molding machine 1.

Figure 9:
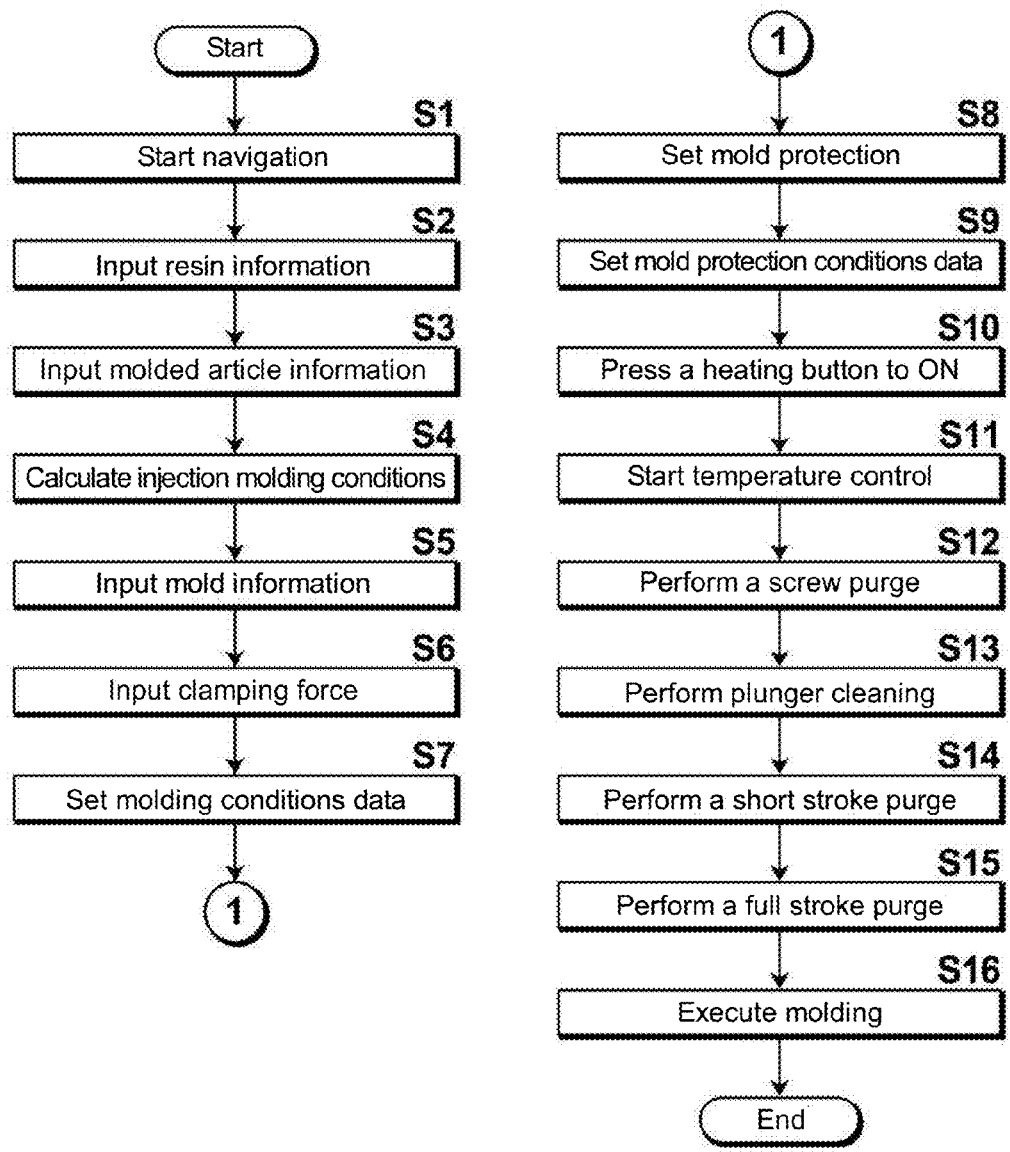
FIG. 9 is a flowchart for explaining a method for assisting in manipulation of the injection molding machine.

A method for assisting in manipulation of the injection molding machine of the disclosure is explained using a flowchart shown in FIG. 9, a navigation screen in FIG. 7, navigation screens in FIG. 10 to FIG. 17 and the normal screen in FIG. 18. The mold 20 has previously been installed in the injection molding machine 1 according to an embodiment.

The operator manipulates the button labeled "POWER ON" on the manipulation panel 48 shown in FIG. 7, so as to start manipulating the injection molding machine 1. The operator touches a place on a display screen of the display device 47 shown in FIG. 7 where the lower "Molding Navigation" is displayed. The display device 47 displays a display screen shown in FIG. 10 that informs of a start of navigation (S1).

Figure 10:
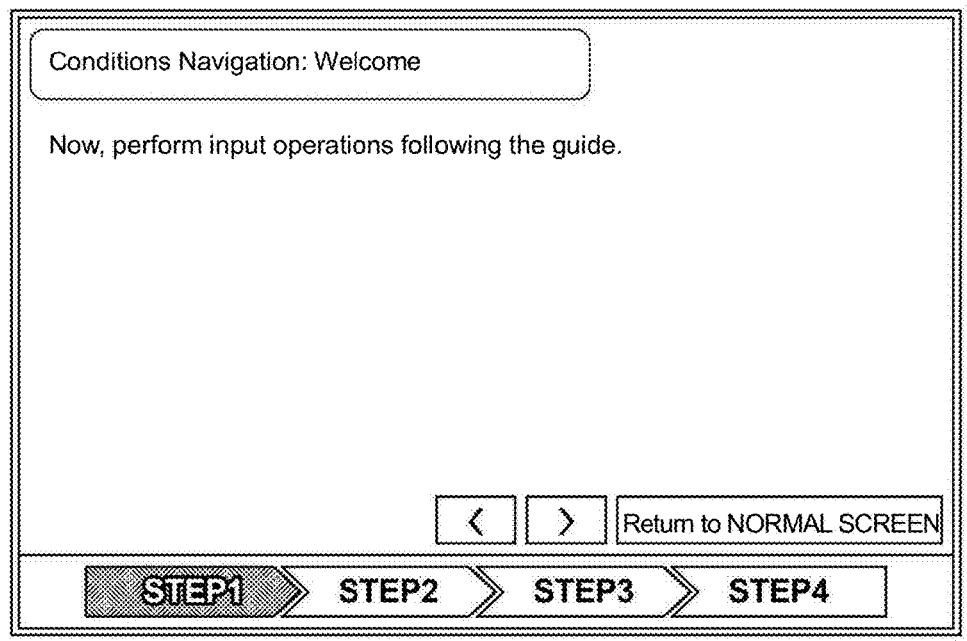
FIG. 10 is an example of a starting screen indicating a start of navigation.

When touching an indication ">" on the display screen shown in FIG. 10, the operator proceeds to a next display screen; when touching an indication "<", the operator returns to a previous display screen. In the guidance showing the procedure for manipulating the injection molding machine 1, the navigation proceeds while ">" is touched to sequentially switch the display screens. When the text "Return to NORMAL SCREEN" on the display screen shown in FIG. 10 is touched, the display device 47 displays the normal screen shown in FIG. 18. The normal screen displays a list of data of molding conditions. The normal screen is capable of accepting the data of molding conditions inputted from the input sections 47A and 48A by the operator.

When the operator touches the indication ">" on the display screen shown in FIG. 10, a screen shown in FIG. 11A is displayed requesting the operator to input the information about the molding material (selection of resin). The display screen shown in FIG. 11A displays a list of names of molding materials. The operator touches, among the list of names of molding materials, the name of the molding material to be used, so as to input the name of the molding material to be used (S2). The molding conditions include a temperature condition for heating the molding material by the heater 69. The temperature condition is generated using the information about the molding material inputted by the operator and a pre-stored data table of temperature conditions of various molding materials. On the display screen shown in FIG. 11A, the operator may also directly input a numerical value as the temperature condition of the heater 69. The plurality of heaters 69, except for the heater 69 at the nozzle 63, are controlled by one temperature condition. The temperature of the heater 69 at the nozzle 63 is controlled to be, e.g., 10 degrees higher than the temperature of the other heaters 69.

When the operator touches the indication ">" on the display screen shown in FIG. 11A, a screen shown in FIG. 11B is displayed requesting the operator to input the information about the molded article (molded item information). The operator inputs volume or weight of the molded article in accordance with the guidance on the display screen shown in FIG. 11B. In accordance with the guidance on the display screen shown in FIG. 11B, the operator inputs wall thickness dimensions of the minimum and maximum portions of the molded article (S3). Specific gravity is generated using the information about the molding material to be used and a pre-stored data table of specific gravity of various molding materials. The specific gravity is used in calculating the volume (=weight×specific gravity).

The molding conditions include injection molding conditions. The injection molding conditions include filling conditions for filling the mold 20 with the molding material. The filling conditions include injection stroke, filling time, injection speed and V-P change position. The injection molding conditions include measurement conditions for measuring the molding material for filling. The measurement conditions include metering value. The injection molding conditions include maximum filling time, dwelling time, and cooling time. The molding conditions are calculated using the pre-stored calculation formulae (S4).

The injection stroke is a distance that the plunger 61 advances. The injection stroke is calculated from a shot volume indicated by the volume of the molded article and a plunger diameter. The plunger diameter is pre-stored as the specification data of the injection molding machine 1. The injection stroke is calculated by the following equation (1).

$$\text{Injection stroke} = \text{shot volume} \div (\Pi \times r \times r) \quad (1)$$

Here, the radius r=plunger diameter÷2

The filling time is a time from when the plunger 61 starts advancing until when it reaches a V-P change position. The standard filling time (in seconds) is set as follows. If the wall thickness dimension of the minimum portion of the molded article is 1 mm or greater, empirically, the standard filling time has a one-to-one relationship with the wall thickness dimension (in millimeters) of the minimum portion of the molded article. Thus, e.g., when the wall thickness dimension of the minimum portion of the molded article is 2 mm, then the standard filling time may be obtained as 2 seconds.

The maximum filling time is set in order to impose an upper limit on the time for filling. The maximum filling time is set equal to a time obtained by adding a predetermined time to the standard filling time.

The injection speed is a speed at which the plunger 61 advances. The injection speed is obtained from the injection stroke and the standard filling time by the following equation (2).

$$\text{Injection speed} = \text{injection stroke} \div \text{standard filling time} \quad (2)$$

The V-P change position is a position of the plunger 61 when switching from the filling step to the dwelling step. The V-P change position is a position of the plunger 61 that has retreated a predetermined distance from a front wall 62b in the injection cylinder 60 shown in FIG. 3. The V-P change position is preset to, e.g., a fixed value of 10 mm.

The metering value is a position of the plunger 61 when the measurement is completed. The metering value is obtained from the injection stroke and the V-P change position by the following equation (3).

$$\text{Metering value} = V\text{-}P \text{ change position} + \text{injection stroke} \quad (3)$$

A number of revolutions of the screw is fixed to, e.g., a fixed value of 90 rpm.

The standard dwelling time (in seconds) is set as follows. Empirically, the standard dwelling time (in seconds) is twice a numerical value of the wall thickness dimension (in millimeters) of the maximum portion of the molded article. Thus, e.g., if the wall thickness dimension of the maximum portion of the molded article is 5 mm, then the standard dwelling time may be obtained as 10 seconds.

Holding pressure is, e.g., a small pressure of 0.1 MPa or less, and is preferably preset to a fixed value of 0.

The standard cooling time (in seconds) is set as follows. Empirically, the standard cooling time (in seconds) is seven times the numerical value of the wall thickness dimension (in millimeters) of the maximum portion of the molded article. Thus, e.g., if the maximum wall thickness is 5 mm, then the standard cooling time may be obtained as 35 seconds.

The calculated values are displayed on the display screen shown in FIG. 11B.

Figure 12A:
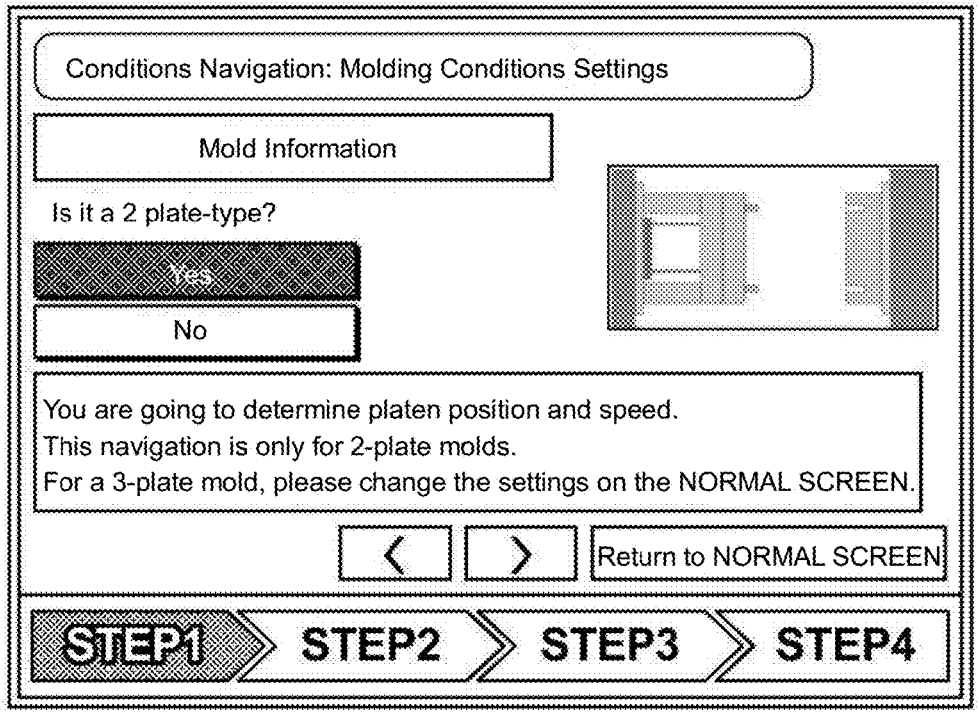
FIG. 12A to FIG. 12D are examples of screens requesting input of mold information.

When the operator touches the indication ">" on the display screen shown in FIG. 11B, a screen shown in FIG. 12A is displayed requesting the operator to input the information about the mold 20 (mold information). In accordance with the guidance on the display screen shown in FIG. 12A, the operator inputs "Yes" if the mold 20 to be used is a 2-plate mold and "No" if it is a 3-plate mold. If "Yes" is inputted, the navigation is continued; if "No" is inputted, the navigation is ended and the display device 47 displays the normal screen.

Figure 12B:
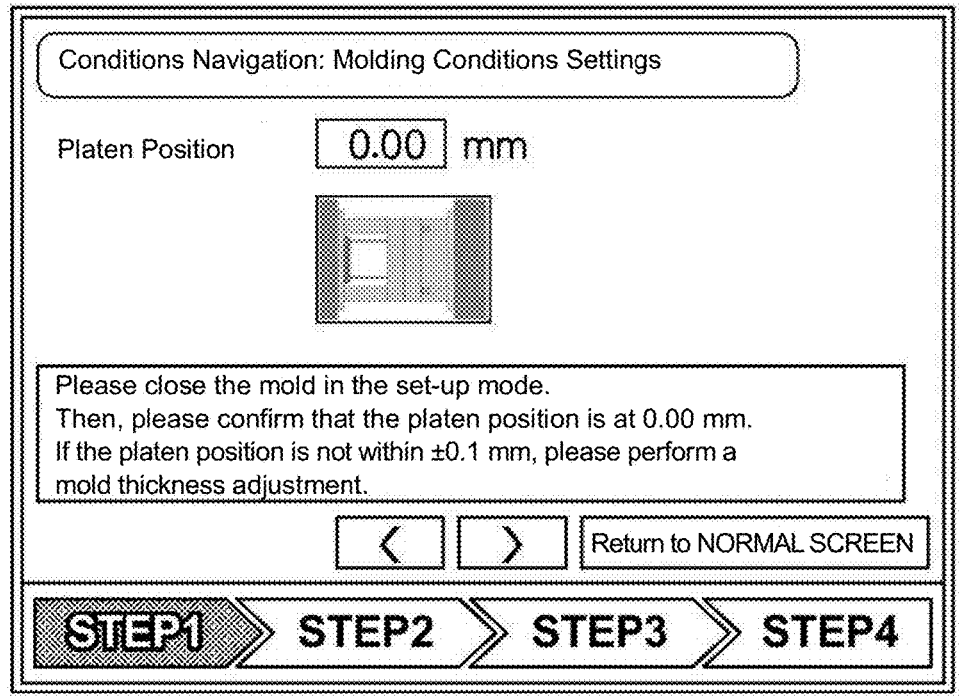

When the operator touches the indication ">" on the display screen shown in FIG. 12A, a screen shown in FIG. 12B is displayed requesting the operator to confirm the information (position of the movable platen after a mold thickness adjustment is performed) about the mold 20. The mold thickness adjustment has been finished when the mold 20 is installed in the injection molding machine 1. In accordance with the guidance on the display screen shown in FIG. 12B, the operator manipulates the button labeled "SET UP" on the manipulation panel 48 to switch the injection molding machine 1 to a set-up mode, and then manipulates the button labeled "MOLD CLOSE". The movable platen 13 moves toward the stationary platen 11 at low speed.

The display screen in FIG. 12B displays a detected value L0 of the position of the movable platen 13. When the detected value L0 becomes 0.00 mm, there is no deviation in an original position. However, e.g., when a displayed value is ±0.1 mm or greater, a deviation occurs in the original position due to thermal expansion or thermal contraction of the mold 20, or the like, and a display screen is thus displayed requesting the operator to perform again the mold thickness adjustment. In accordance with the guidance on the display screen, the operator manipulates the button labeled "SET UP" on the manipulation panel 48 to switch the injection molding machine 1 to the set-up mode, and manipulates a button labeled "FIX", so as to perform again the mold thickness adjustment for the injection molding machine 1. The movable platen 13 moves toward the stationary platen 11 at low speed to close the mold 20. In the injection molding machine 1, a position at which movement of the movable platen 13 stops is set again as the original position (0.00 mm) for control.

Figure 12C:
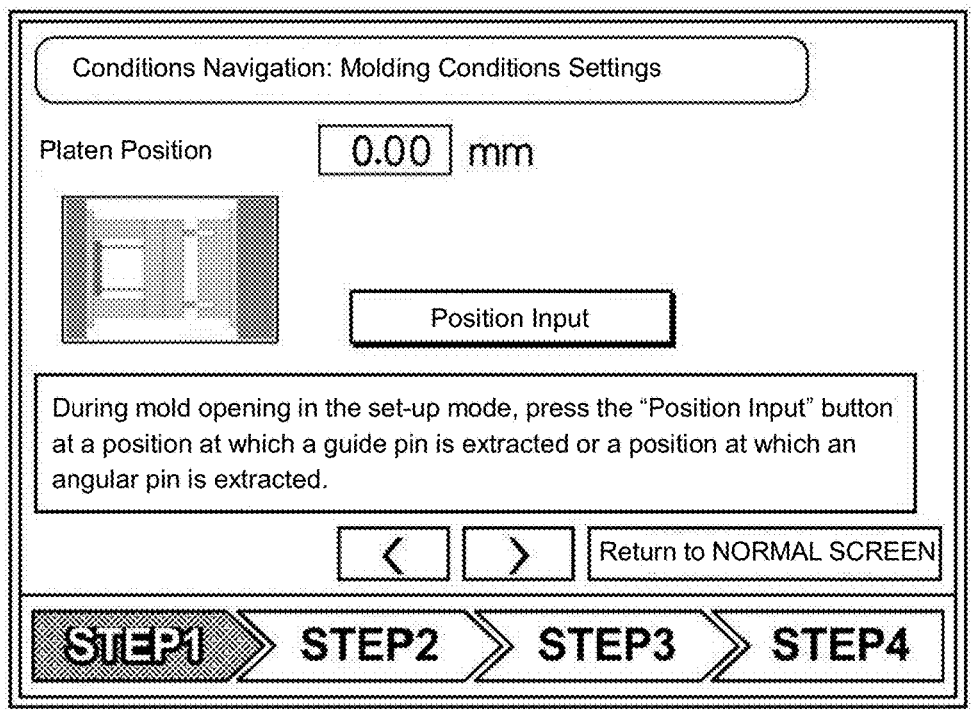

When the operator touches the indication ">" on the display screen shown in FIG. 12B, a screen shown in FIG. 12C is displayed requesting the operator to input the information (position of the movable platen at which various pins are extracted) about the mold 20. In accordance with the guidance on the display screen shown in FIG. 12C, the operator, while actually visually observing the mold 20, manipulates the button labeled "SET UP" on the manipulation panel 48 to switch the injection molding machine 1 to the set-up mode, and manipulates the button labeled "MOLD OPEN". The movable platen 13 moves at low speed to open the mold 20. The operator stops the opening operation of the mold 20 at a position L1 at which a guide pin or an angular pin is extracted from the mold 20. The operator touches an indication "Position Input" on the display screen shown in FIG. 12C. The position L1 of the movable platen 13 at which the various pins are extracted is set for the injection molding machine 1. The display screen shown in FIG. 12C displays the detected value L1 of the position of the movable platen 13.

Figure 12D:
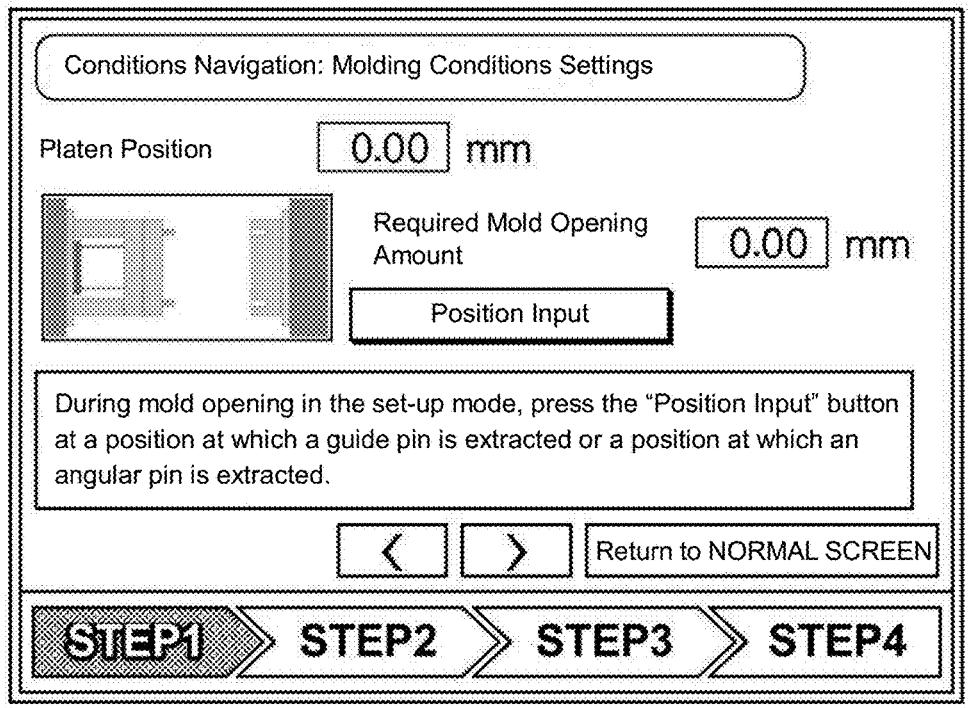

When the operator touches the indication ">" on the display screen shown in FIG. 12C, a screen shown in FIG. 12D is displayed requesting the operator to input the information (opening position of the mold 20 required for taking out the molded article) about the mold 20. In accordance with the guidance on the display screen shown in FIG. 12D, the operator, while actually visually observing the mold 20, manipulates the button labeled "SET UP" on the manipulation panel 48 to switch the injection molding machine 1 to the set-up mode, and manipulates the button labeled "MOLD OPEN". The movable platen 13 moves at low speed to open the mold 20. The operator stops the opening operation of the mold 20 at a position L2 at which the molded article can be taken out of the mold 20. The operator touches the indication "Position Input" on the display screen shown in FIG. 12D. The position L2 of the movable platen 13 at which the molded article can be taken out is set for the injection molding machine 1. The display screen shown in FIG. 12D displays the detected value L2 of the position of the movable platen 13. When the position L2 of the movable platen 13 at which the molded article can be taken out is known from the shape of the mold 20, the operator may directly input a numerical value as the position L2 on the display screen shown in FIG. 12D.

The molding conditions include mold opening/closing conditions for opening and closing the mold 20 by the mold clamping device 2. The mold opening/closing conditions include mold closing conditions and mold opening conditions. The mold opening/closing conditions are calculated using the pre-stored calculation formulae (S5). In the present embodiment, the position L0 is used as the original position (0.00 mm), and there is a relationship of position L0<position L1<position L2.

The mold closing conditions are calculated by, e.g., the following equations (4) to (10). A mold closing speed Va is a speed at which the movable platen 13 is moved from the position L2 to a position La. A mold closing speed Vb is a speed at which the movable platen 13 is moved from the position La to a position Lb. A mold closing speed Vc is a speed at which the movable platen 13 is moved from the position Lb to a position Lc. A mold closing speed Vd is a speed at which the movable platen 13 is moved from the position Lc to the position L0. The movable platen 13 moves in a direction of closing the mold 20 from the position L2 to the position L0. The maximum mold closing speed is pre-stored as the specification data of the injection molding machine 1.

$$\text{Position } La = \text{position } L2 - 10 \text{ mm} \tag{4}$$

$$\text{Position } Lb = \text{position } L1 + 5 \text{ mm} \tag{5}$$

$$\text{Position } Lc = \text{position } L0 + 5 \text{ mm} \tag{6}$$

$$\text{Mold closing speed } Va = \text{maximum mold closing speed} \times 0.5 \tag{7}$$

$$\text{Mold closing speed } Vb = \text{maximum mold closing speed} \times 0.5 \tag{8}$$

$$\text{Mold closing speed } Vc = \text{maximum mold closing speed} \times 0.1 \tag{9}$$

$$\text{Mold closing speed } Vd = \text{maximum mold closing speed} \times 0.1 \tag{10}$$

In an interval from the position Lc to the position L0, an upper limit of torque of the driving device 14 of the mold clamping device 2 is set smaller than in the other intervals, so that the mold 20 will not be closed until the upper limit of the torque is exceeded.

The mold opening conditions are calculated by, e.g., the following equations (11) to (14). A mold opening speed Ve is a speed at which the movable platen 13 is moved from the position L0 to the position L1. A mold opening speed Vf is a speed at which the movable platen 13 is moved from the position L1 to a position Lf. A mold opening speed Vg is a speed at which the movable platen 13 is moved from the position Lf to the position L2. The movable platen 13 moves in a direction of opening the mold 20 from the position L0 to the position L2. The maximum mold opening speed is pre-stored as the specification data of the injection molding machine 1.

$$\text{Position } Lf = \text{position } L2 - 10 \text{ mm} \tag{11}$$

$$\text{Mold opening speed } Ve = \text{maximum mold opening speed} \times 0.1 \tag{12}$$

$$\text{Mold opening speed } Vf = \text{maximum mold opening speed} \times 0.5 \tag{13}$$

$$\text{Mold opening speed } Vg = \text{maximum mold opening speed} \times 0.5 \tag{14}$$

When the operator touches the indication ">" on the display screen shown in FIG. 12D, a screen is displayed requesting the operator to input the information (clamping force) about the mold 20. The operator inputs the clamping force in accordance with the guidance on the display screen (S6).

Figure 13:
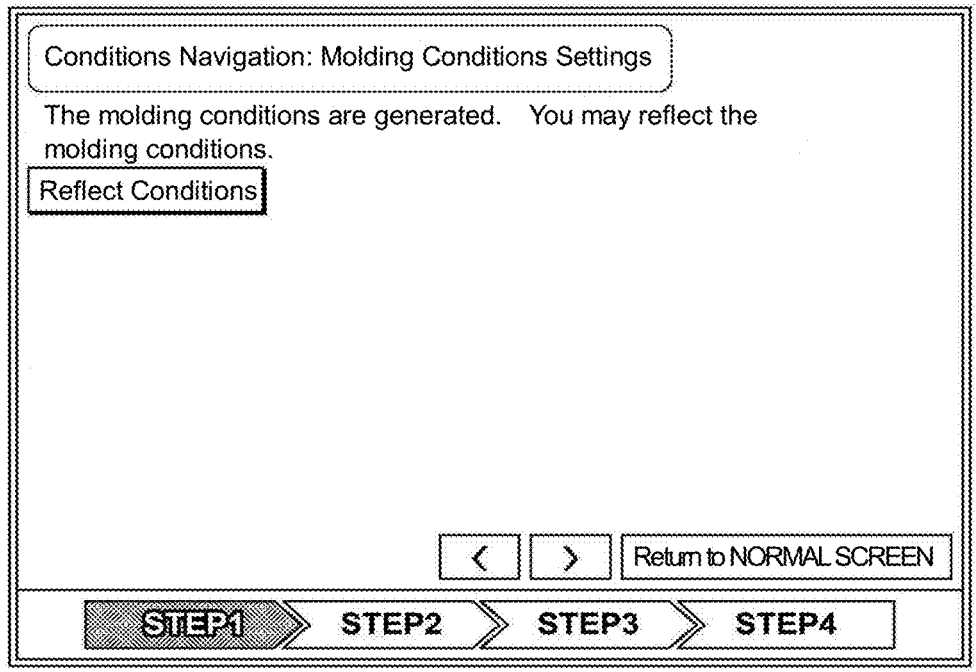
FIG. 13 is an example of a screen for reflecting values set as molding conditions.

When the operator touches the indication ">" on the display screen that requests the operator to input the clamping force, a screen shown in FIG. 13 is displayed requesting the operator to reflect the values set for the molding conditions in control of the injection molding machine 1. The operator touches an indication "Reflect Conditions" on the display screen shown in FIG. 13. The injection molding machine 1 starts control in accordance with data of the generated molding conditions (S7).

Figure 14:
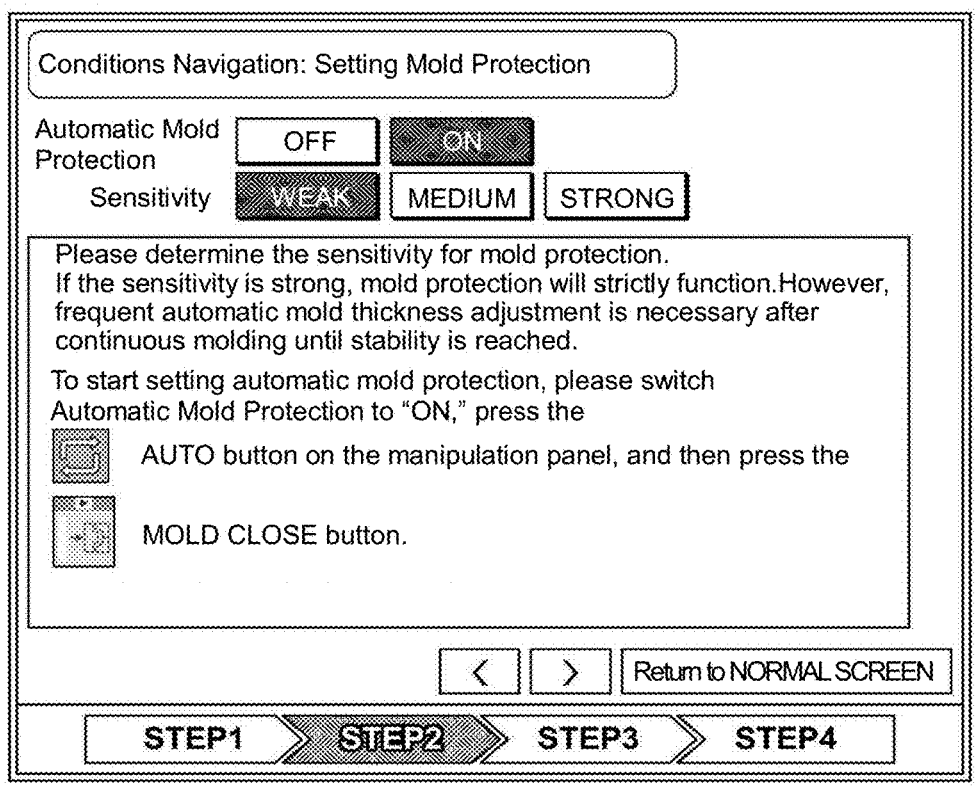
FIG. 14 is an example of a screen encouraging input of information about a mold protection function.

When the operator touches the indication ">" on the display screen shown in FIG. 13, a screen shown in FIG. 14 is displayed requesting the operator to input information for protecting the mold 20. The operator touches either the indication "ON" or the indication "OFF" displayed on the display screen shown in FIG. 14, so as to input whether or not to use the function of protecting the mold 20. The operator touches any one of indications "WEAK", "MEDIUM" and "STRONG" displayed on the display screen shown in FIG. 14, so as to input the sensitivity of the function of protecting the mold 20.

In accordance with the guidance on the display screen shown in FIG. 14, the operator manipulates the predetermined manipulation buttons 48B on the manipulation panel 48, so as to make the injection molding machine 1 automatically perform predetermined operations. The injection molding machine 1 automatically performs the predetermined operations to automatically generate the conditions for protecting the mold 20 (S9). Explanation of the method for automatically generating the conditions for protecting the mold 20 is omitted. Various methods may be adopted as the method for automatically generating the conditions for protecting the mold 20. The function of protecting the mold 20 is, e.g., a function of monitoring the torque of the driving device 14 of the mold clamping device 2 so as to stop the driving device 14 when a predetermined monitoring torque is exceeded. The monitoring torque has a smaller torque value with strong sensitivity than with weak sensitivity.

Figure 15:
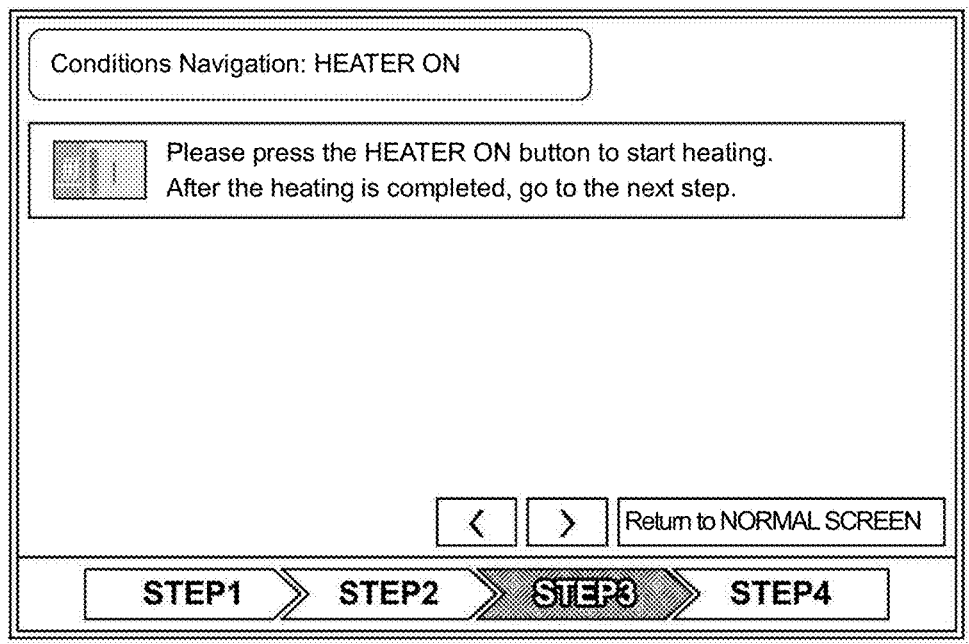
FIG. 15 is an example of a screen requesting a manipulation to start heating of a heater.

When the operator touches the indication ">" on the display screen shown in FIG. 14, a screen shown in FIG. 15 is displayed requesting the operator to activate the heater 69. In accordance with the guidance on the display screen shown in FIG. 15, the operator manipulates the button 48B-1 labeled "HEATER ON" on the manipulation panel 48 (S10). The heater 69 is controlled to start heating in accordance with the temperature condition (S11).

Figure 16A:
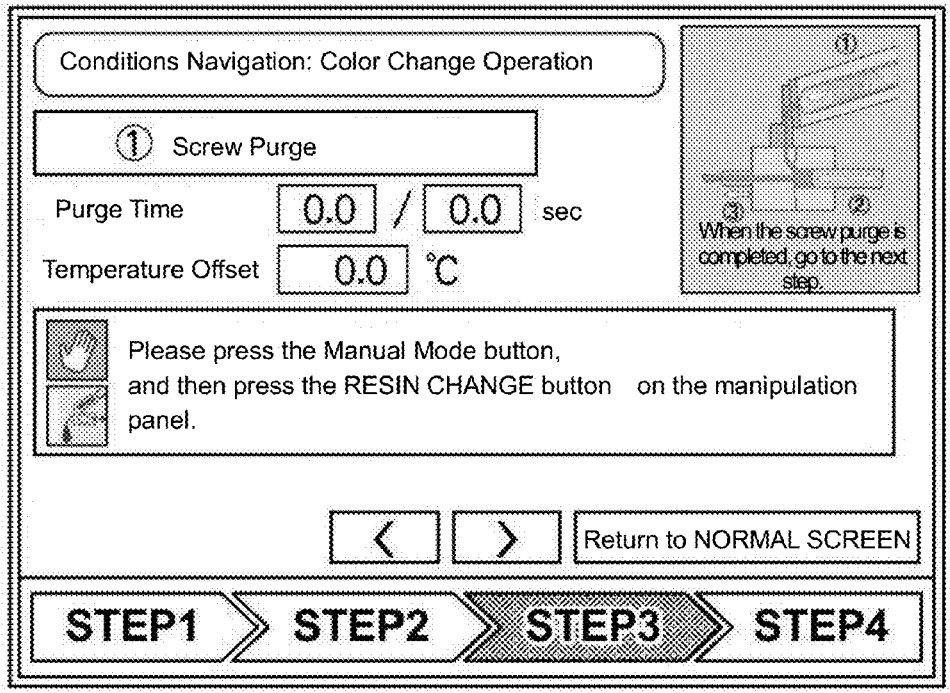
FIG. 16A to FIG. 16D are examples of screens requesting a manipulation to carry out a purge.

After each of the cylinders 50, 60, 62 and the nozzle 63 is heated to a predetermined temperature by the heater 69, when the operator touches the indication ">" on the display screen shown in FIG. 15, a screen shown in FIG. 16A is displayed requesting the operator to carry out a color change by a screw purge. The color change is performed in the following order: a screw purge, plunger cleaning, a short stroke purge, and a full stroke purge. In accordance with the guidance on the display screen shown in FIG. 16A, the operator manipulates the button 48B-2 labeled "MANU." and then the button 48B-3 labeled "RESIN CHANGE" on the manipulation panel 48. The screw purge is started (S12). The display screen shown in FIG. 16A displays a preset time for performing the purge. On the display screen shown in FIG. 16A, the operator may input and change the time for performing the purge.

In the screw purge, in a state where the plunger 61 advances and a predetermined gap is formed between the front wall 62b in the injection cylinder 60 and a tip of the plunger 61, the screw 51 is rotated to discharge the molding material inside the plasticization cylinder 50 from the nozzle 63 through the injection cylinder 60. If the number of revolutions of the screw 51 does not reach a preset number of revolutions (e.g., 50 rpm), a warning is issued to the operator to raise the temperature of the heater. On the display screen shown in FIG. 16A, an offset may be inputted for the temperature condition. The operator inputs the offset in accordance with the guidance on the display screen shown in FIG. 16A. The operator, while visually confirming the discharged molding material, continues performing the screw purge until the molding material used last time is not discharged any more.

Figure 16B:
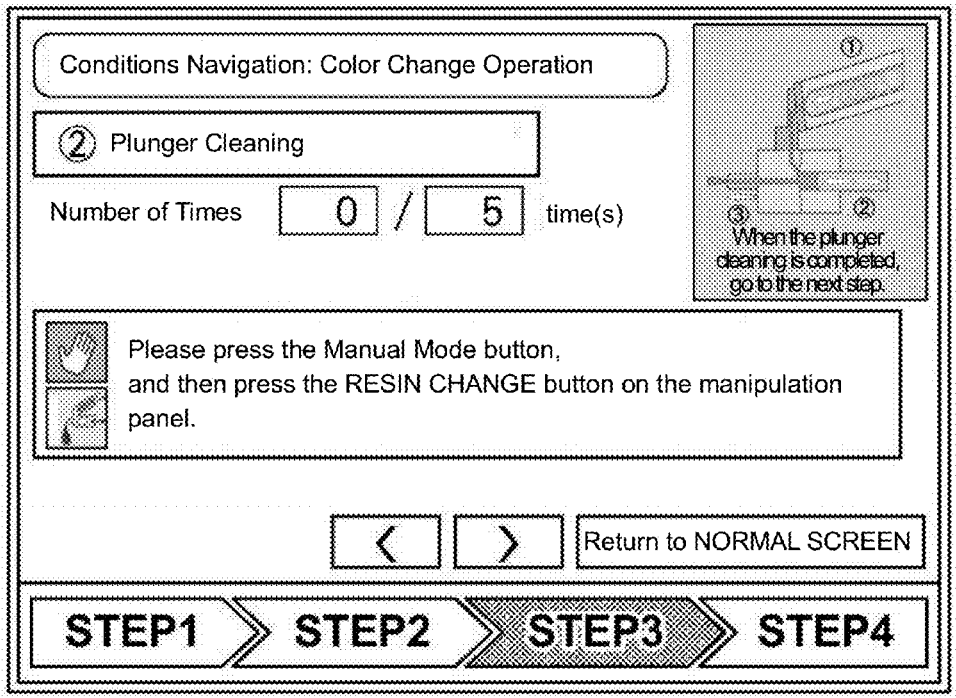

After the screw purge is completed, when the operator touches the indication ">" on the display screen shown in FIG. 16A, a screen shown in FIG. 16B is displayed requesting the operator to carry out a color change by plunger cleaning. In accordance with the guidance on the display screen shown in FIG. 16B, the operator manipulates the button 48B-2 labeled "MANU." and then the button 48B-3 labeled "RESIN CHANGE" on the manipulation panel 48. The plunger cleaning is started (S13). The display screen shown in FIG. 16B displays a preset number of times (e.g., 5 times) of advancing and retreating the plunger 61. The display screen shown in FIG. 16B displays an actual number of times the plunger 61 has advanced and retreated. In the plunger cleaning, the rotation of the screw 51 is stopped, and only the plunger 61 advances and retreats.

Figure 16C:
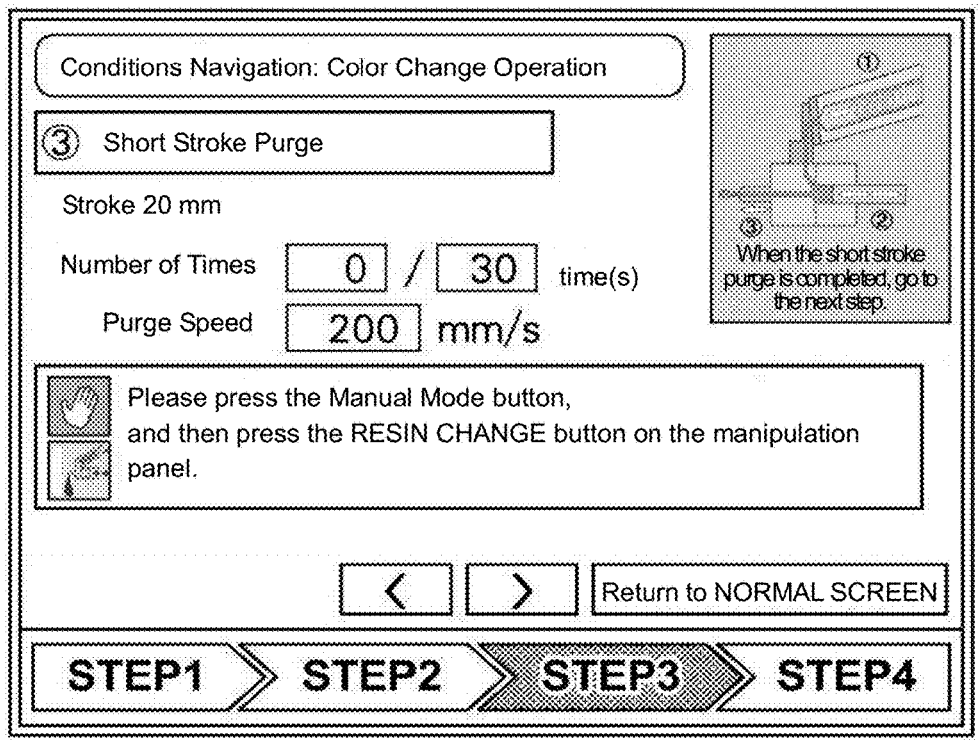

After the plunger cleaning is completed, when the operator touches the indication ">" on the display screen shown in FIG. 16B, a screen shown in FIG. 16C is displayed requesting the operator to carry out a color change by a short stroke purge. In accordance with the guidance on the display screen shown in FIG. 16C, the operator manipulates the button 48B-2 labeled "MANU." and then the button 48B-3 labeled "RESIN CHANGE" on the manipulation panel 48. The short stroke purge is started (S14). The display screen shown in FIG. 16C displays a preset stroke (e.g., 20 mm) being a distance that the plunger 61 advances and retreats, a preset purge speed (e.g., 200 mm/s) being a speed at which the plunger 61 advances, and a preset number of times (e.g., 5 times) of advancing and retreating the plunger 61. The display screen shown in FIG. 16C displays an actual number of times the plunger 61 has advanced and retreated. On the display screen shown in FIG. 16C, the operator may input and change the purge speed and the number of times. In the short stroke purge, a series of operations from measurement to filling are repeated the specified number of times.

Figure 16D:
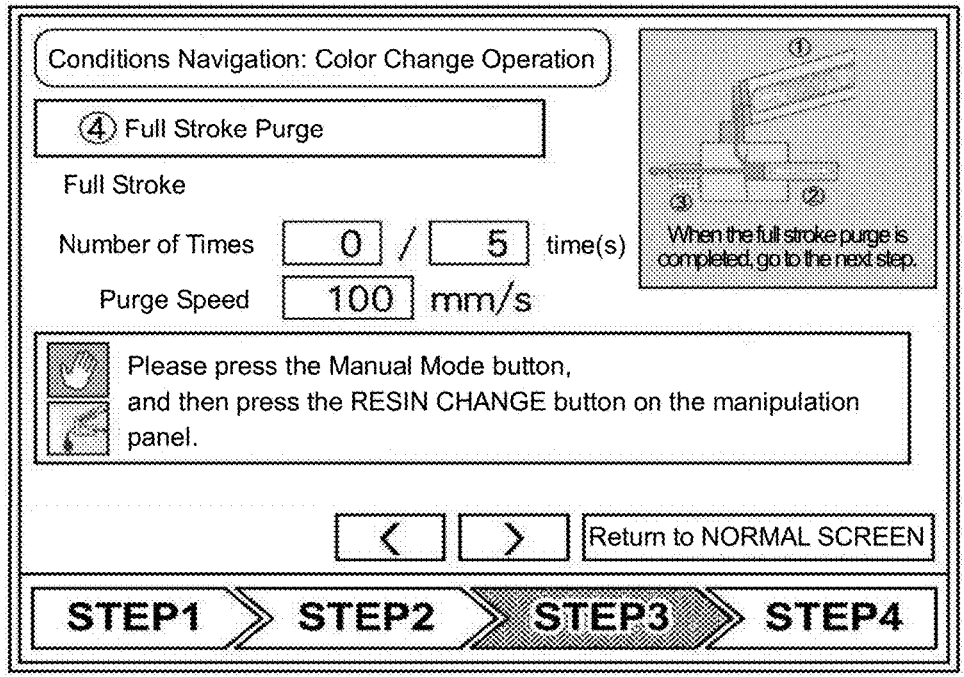

After the short stroke purge is completed, when the operator touches the indication ">" on the display screen shown in FIG. 16C, a screen shown in FIG. 16D is displayed requesting the operator to carry out a color change by a full stroke purge. In accordance with the guidance on the display screen shown in FIG. 16D, the operator manipulates the button 48B-2 labeled "MANU." and then the button 48B-3 labeled "RESIN CHANGE" on the manipulation panel 48. The full stroke purge is started (S14). The display screen shown in FIG. 16D displays a purge speed (e.g., 100 mm/s) being a speed at which the plunger 61 advances, and a number of times (e.g., 5 times) of advancing and retreating the plunger 61. The display screen shown in FIG. 16D displays an actual number of times the plunger 61 has advanced and retreated. On the display screen shown in FIG. 16D, the operator may input and change the purge speed and the number of times. In the full stroke purge, a series of operations from measurement to filling are repeated the specified number of times. In the full stroke purge, a distance between a farthest position to which the plunger 61 can retreat and a farthest position to which the plunger 61 can advance is taken as the advancing and retreating stroke. The farthest positions to which the plunger 61 can retreat and advance are pre-stored as the specification data of the injection molding machine 1.

Figure 17:
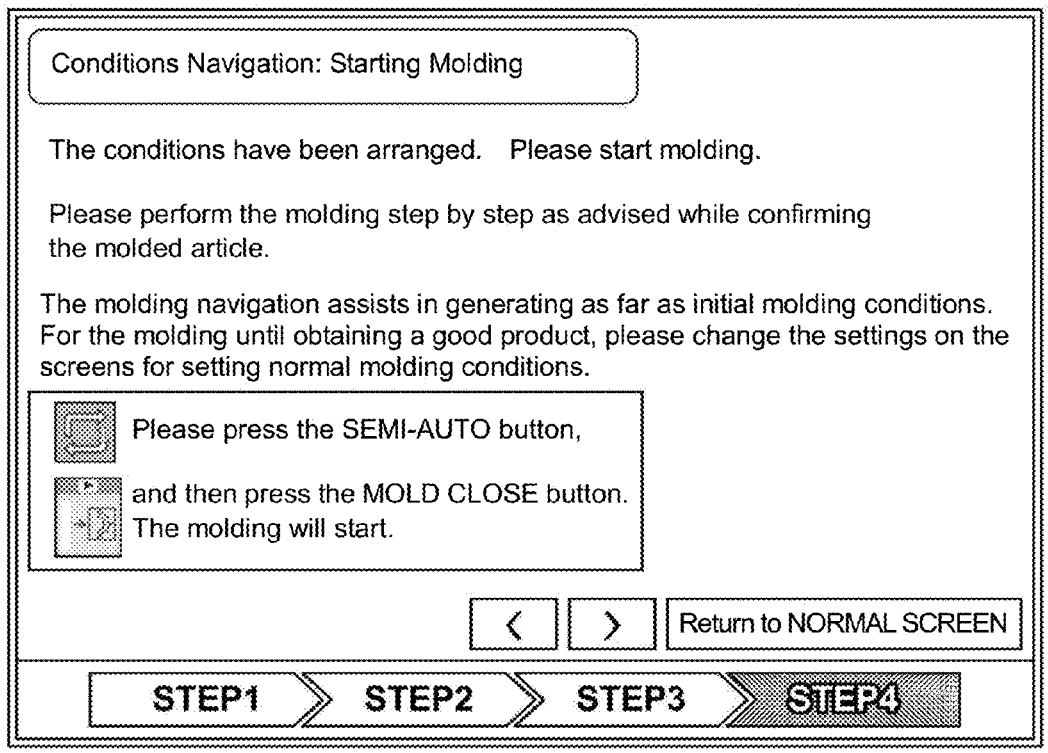
FIG. 17 is an example of a screen requesting a manipulation to start molding.

After the full stroke purge is completed, when the operator touches the indication ">" on the display screen shown in FIG. 16D, a screen shown in FIG. 17 is displayed requesting the operator to start molding. In accordance with the guidance on the display screen shown in FIG. 17, the operator manipulates the button 48B-4 labeled "SEMI-AUTO" and then the button 48B-5 labeled "MOLD CLOSE (AUTO START)" on the manipulation panel 48. The injection molding machine 1 executes one molding cycle (S16). The injection molding machine 1 is controlled in accordance with the set molding conditions and the set conditions for protecting the mold.

Figure 19:
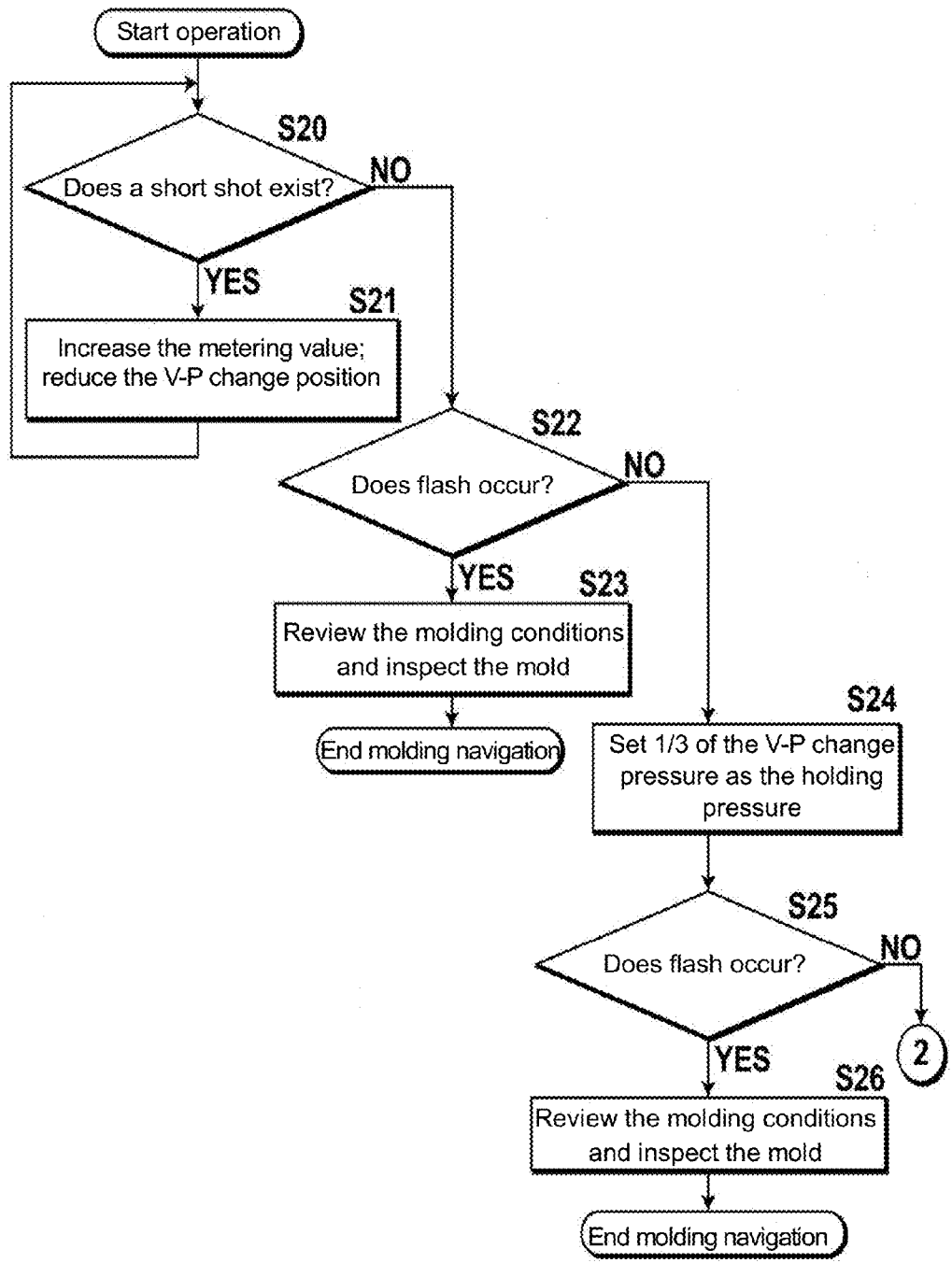
FIG. 19 is a flowchart showing a flow of displaying messages that assist in a manipulation of inputting information about a state of a molding defect of the molded article so as to improve the molding defect of the molded article.

After one molding cycle is completed, a screen is displayed requesting the operator to input information about a molding defect of the molded article. In accordance with the guidance on the display screen, the operator visually confirms the state of the molded article and input the information about the molding defect of the molded article. The display screen displays, e.g., a message saying "Does a short shot exist in the molded article?" (S20) and a message saying "Does flash occur in the molded article?" (S22) in order as shown in the flowchart in FIG. 19, and allows the operator to input "YES" or "NO".

Figure 20:
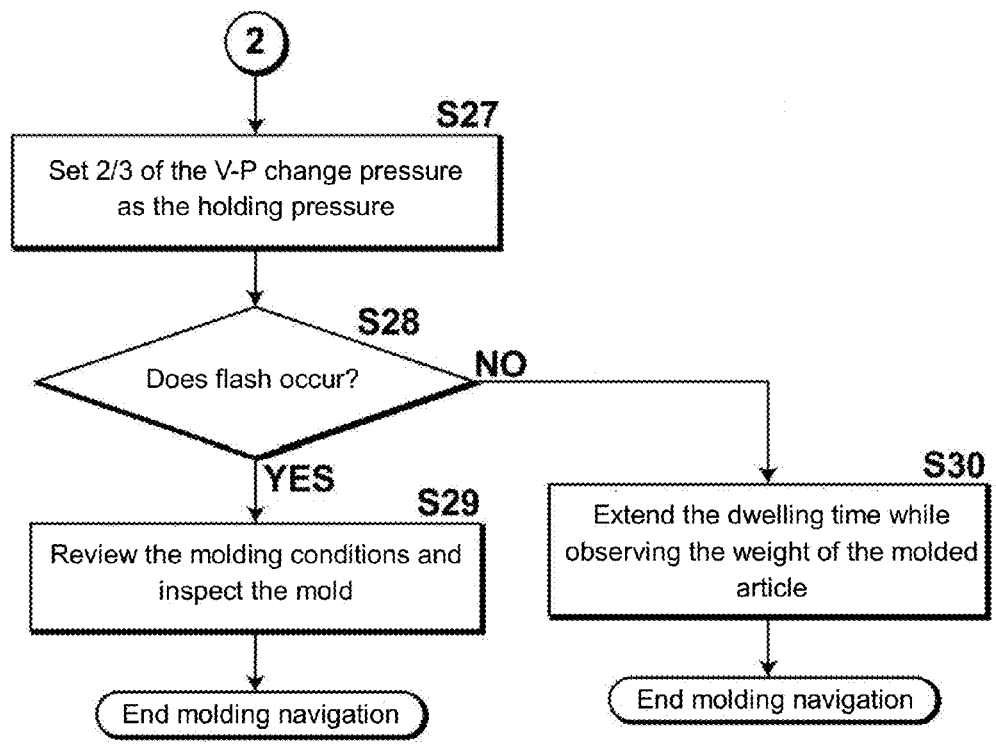
FIG. 20 is a flowchart showing a flow of displaying messages that assist in the manipulation of inputting information about the state of the molding defect of the molded article so as to improve the molding defect of the molded article.

After the operator has inputted the information about the molding defect, a screen is displayed requesting the operator to perform a manipulation for improving the inputted molding defect. The operator changes the molding conditions in accordance with the guidance on the display screen. The display screen displays, e.g., a message saying "Increase the metering value to reduce the V-P change position" (S21) when a short shot exists (S20—YES), and a message saying "Review the molding conditions and inspect the mold" (S23) when flash occurs (S22—YES), as shown in the flowchart in FIG. 19. The display screen displays, e.g., a message saying "Set ⅓ of the V-P change pressure as the holding pressure" (S24) when no short shot exists and no flash occurs (S22—NO), as shown in the flowchart in FIG. 19, and again displays a screen that requests the operator to mold the molded article. The display screen displays, again, the message saying "Does flash occur in the molded article?" (S25), the message saying "Review the molding conditions and inspect the mold" (S26) when flash occurs (S25—YES), and a message saying "Set ⅔ of the V-P change pressure as the holding pressure" (S27) when no flash occurs (S25—NO), as shown in the flowcharts in FIG. 19 and FIG. 20, and displays again the screen that requests the operator to mold the molded article. The display screen again displays, e.g., the message saying "Does a short shot exist in the molded article?" (S28), the message saying "Review the molding conditions and inspect the mold" (S29) when flash occurs (S28—YES), and a message saying "Extend the dwelling time while observing the weight of the molded article" (S30) when no flash occurs (S28—NO), as shown in the flowchart in FIG. 20.

After confirming that the molded article is well finished, the operator performs a predetermined manipulation to switch to automatic operation that performs the molding cycle repeatedly.

A terminal not directly connected to the control device 4, such as a portable tablet terminal or the like, may also display the screens and guidance that assist in the manipulations as shown in FIG. 10 to FIG. 17, and may be wirelessly or wiredly connected to the control device 4 if necessary, so as to store the data in the memory section 41.

What is claimed is:

1. An injection molding machine comprising:
    a mold clamping device, opening and closing a mold;
    an injection device, comprising a cylinder, a nozzle, and a heater that heats a molding material inside the cylinder and the nozzle, and filling the melted molding material into the mold;
    a display device, displaying an operator's procedure for manipulating the mold clamping device and the injection device;
    a manipulation panel, for the operator to manipulate the mold clamping device and the injection device; and
    a control device, comprising a signal receiving section that receives an input signal inputted by the operator's manipulation of the manipulation panel, and controlling the mold clamping device and the injection device in accordance with the input signal,
    wherein the injection molding machine molds a molded article in the mold,
    wherein the control device comprises:
        a molding condition setting section, displaying in the display device at least one screen that requests the operator to input information about a molding material, information about a molded article and information about a mold and a guidance that shows a procedure for the manipulation, and generating and setting a molding condition based on the information about the molding material, the information about the molded article and the information about the mold;
        a heater control section, assisting in a manipulation of, after the molding condition is set, displaying in the display device at least one screen that requests the operator to manipulate the manipulation panel to activate the heater and a guidance that shows a procedure for the manipulation, so as to activate the heater; and
        a molding material change control section, assisting in a manipulation of, after the cylinder and the nozzle are heated to a predetermined temperature by the heater, displaying in the display device a plurality of screens in a predetermined order, each of the screens contains at least one dialogue box which shows a guidance to the operator to perform a procedure for the manipulation to manipulate the manipulation panel to make the injection molding machine perform one of a plurality of kinds of purges, so as to carry out a molding material change.

2. The injection molding machine of claim 1, wherein the molding condition at least comprises a temperature condition during heating of the molding material by the heater, a filling condition comprising an injection speed during filling of the molding material into the mold, a measurement condition comprising a metering value for measuring the molding material for filling, and a mold opening/closing condition comprising a position and a speed at which the mold is opened and closed.

3. The injection molding machine of claim 1, wherein the control device comprises a protecting condition setting section that, after the molding condition is set, displays in the display device at least one screen that requests the operator to input information about a function of protecting the mold and a guidance that shows a procedure for the manipulation, so as to generate and set a condition for protecting the mold based on the information for protecting the mold.

4. The injection molding machine of claim 1, wherein the plurality of kinds of purges comprise at least a screw purge, a plunger cleaning, a short stroke purge, and a full stroke purge.

5. The injection molding machine of claim 4, wherein the molding material change control section assisting in the manipulation of carrying out the molding material change displays in the display device the plurality of screens that requests the operator to manipulate the manipulation panel to start each of the screw purge, the plunger cleaning, the short stroke purge and the full stroke purge in the above order and a guidance that shows a procedure for the manipulation.

6. The injection molding machine of claim 1, wherein the control device comprises: a molding defect input control section, assisting in displaying in the display device at least one screen that requests the operator to input information about a state of a molding defect formed in the molded article and a guidance that shows a procedure for the manipulation, so as to input the information about the state of the molding defect; and a molding defect improving control section, assisting in a manipulation of displaying in the display device a method for improving the molding defect according to the information about the state of the molding defect, and displaying in the display device at least one screen that requests the operator to improve the molding defect and a guidance that shows a procedure for the manipulation, so as to improve the molding defect.

7. A method for assisting in manipulation of an injection molding machine, wherein the injection molding machine comprises: a mold clamping device, opening and closing a mold; an injection device, comprising a cylinder, a nozzle, and a heater that heats a molding material inside the cylinder and the nozzle, and filling the melted molding material into the mold; a display device, displaying an operator's procedure for manipulating the mold clamping device and the injection device; a manipulation panel, for the operator to manipulate the mold clamping device and the injection device; and a control device, comprising a signal receiving section that receives an input signal inputted by the operator's manipulation of the manipulation panel, and controlling the mold clamping device and the injection device in accordance with the input signal, and wherein the injection molding machine molds a molded article in the mold, the method for assisting in manipulation of the injection molding machine comprising, by the control device, displaying in the display device at least one screen that requests the operator to input information about a molding material, information about a molded article and information about a mold and a guidance that shows a procedure for the manipulation, so as to generate and set a molding condition based on the information about the molding material, the information about the molded article and the information about the mold;

assisting in a manipulation of, after setting the molding condition, displaying in the display device at least one screen that requests the operator to manipulate the manipulation panel to activate the heater and a guidance that shows a procedure for the manipulation, so as to activate the heater; and assisting in a manipulation of, after heating the cylinder and the nozzle to a predetermined temperature by the heater, displaying in the display device a plurality of screens in a predetermined order, each of the screens contains at least one dialogue box which shows a guidance to the operator to perform a procedure for the manipulation to manipulate the manipulation panel to make the injection molding machine perform one of a plurality of kinds of purges, so as to carry out a molding material change.

\* \* \* \* \*